US012500864B2

United States Patent
Hegde et al.

(10) Patent No.: US 12,500,864 B2
(45) Date of Patent: Dec. 16, 2025

(54) PORT-TO-PORT TUNNEL CREATION FOR SECURE REMOTE ACCESS TO NETWORKED DEVICES

(71) Applicant: SCLERA HOLDINGS, LLC, Wheeling, IL (US)

(72) Inventors: Vikram Hegde, Prospect Heights, IL (US); Avinash Kumar, Sahibganj (IN); Nikhil Adiga, Mangalore (IN)

( * ) Notice: Subject to any disclaimer, the term of this patent is extended or adjusted under 35 U.S.C. 154(b) by 350 days.

(21) Appl. No.: 18/338,163

(22) Filed: Jun. 20, 2023

(65) Prior Publication Data

US 2024/0430231 A1    Dec. 26, 2024

(51) Int. Cl.
    *H04L 29/06*      (2006.01)
    *H04L 9/40*      (2022.01)
    *H04W 76/14*      (2018.01)

(52) U.S. Cl.
    CPC ........ *H04L 63/0245* (2013.01); *H04L 63/029* (2013.01); *H04L 63/104* (2013.01); *H04L 63/108* (2013.01); *H04L 63/162* (2013.01); *H04W 76/14* (2018.02)

(58) Field of Classification Search
    CPC . H04L 63/0245; H04L 63/029; H04L 63/104; H04L 63/108; H04L 63/162; H04L 63/0272; H04W 76/14
    See application file for complete search history.

(56) References Cited

U.S. PATENT DOCUMENTS

| | | | |
|---|---|---|---|
| 7,260,597 | B1 | 8/2007 | Hofrichter et al. |
| 8,527,306 | B1 | 9/2013 | Reeser et al. |
| 9,806,900 | B2 | 10/2017 | Jacobson et al. |
| 10,229,394 | B1 | 3/2019 | Davis et al. |
| 10,740,169 | B1 | 8/2020 | Passaretti et al. |
| 2012/0254345 | A1 | 10/2012 | Montoya |
| 2013/0016628 | A1* | 1/2013 | Bertani ................ H04L 41/046 370/255 |

(Continued)

FOREIGN PATENT DOCUMENTS

| | | | |
|---|---|---|---|
| CN | 115801290 A | * | 3/2023 |
| WO | 2019216975 A1 | | 11/2019 |

OTHER PUBLICATIONS

Dini, Mahyar Taj, et al., "Internet of Things security problems", arXiv preprint arXiv; 1902.08597, 2019.

(Continued)

*Primary Examiner* — Harunur Rashid

(57) ABSTRACT

An access control device monitors devices on a local area network and transmits alerts to a premises operator upon detection of any failures based on monitored operational data. The access control device transmits alerts to relevant device maintenance vendors regarding failures. Vendor alerts may be automatic or may be instigated by the premises operator. The vendor may be provided temporary remote access to one or more devices on the premises LAN for troubleshooting, remote repair, or configuration purposes without port forwarding by a network access device. Access rights may be time limited or cease upon completion of a maintenance activity by the vendor, and may be retracted at any time by the premises operator. The access control device limits network access of the vendor to only permitted devices; no other devices on the network are visible to or accessible by the vendor.

27 Claims, 8 Drawing Sheets

(56) References Cited

U.S. PATENT DOCUMENTS

| | | |
|---|---|---|
| 2017/0214550 A1 | 7/2017 | Kumar et al. |
| 2018/0336113 A1 | 11/2018 | Asawa et al. |
| 2019/0289480 A1 | 9/2019 | Safavi |
| 2020/0028894 A1 | 1/2020 | Memon et al. |
| 2020/0050494 A1 | 2/2020 | Bartfai-Walcott et al. |
| 2020/0053163 A1* | 2/2020 | Ngo .................. H04L 12/66 |
| 2020/0125053 A1 | 4/2020 | Park et al. |
| 2020/0136906 A1 | 4/2020 | Guim Bernat et al. |
| 2021/0105151 A1* | 4/2021 | Ngo .................. H04L 63/166 |

OTHER PUBLICATIONS

Ji, Shujian, et al., "Cmonitor: A monitoring and alarming platform for container-based clouds", International Conference on Cloud Computing. Springer, Cham., 2019.

Souza, Arthur, et al., "Osmotic monitoring of micro services between the edge and cloud", 2018 IEEE 20th International Conference on High Performance Computing and Communications; IEEE 16th International Conference on Smart City; IEEE 4th International Conference on Data Science and Systems, IEEE, 2018.

Stubbs, Joe, et al., "Distributed systems of micro services using docker and serenade", 2015 7th International Workshop on Science Gateways, 2015.

Bellavista, Paolo, et al., "Feasibility of fog computing deployment based on docker containerization over raspberrypi", Proceedings of the 18th international conference on distributed computing and networking, 2017.

Von Leon, David, et al., "A performance exploration of architectural options for a middleware for decentralized lightweight edge cloud architectures", IoTBDS 2018: Proceedings of the 3rd international Conference on Internet of Things, Big Data and Security; Funchal, Madeira, Portugal, 2018, 19-21.

Xingtao, Liu, et al., "Network virtualization by using software-defined networking controller based Docker", 2016 IEEE Information Technology, Networking Electronic and Automation Control Conference. IEEE, 2016.

* cited by examiner

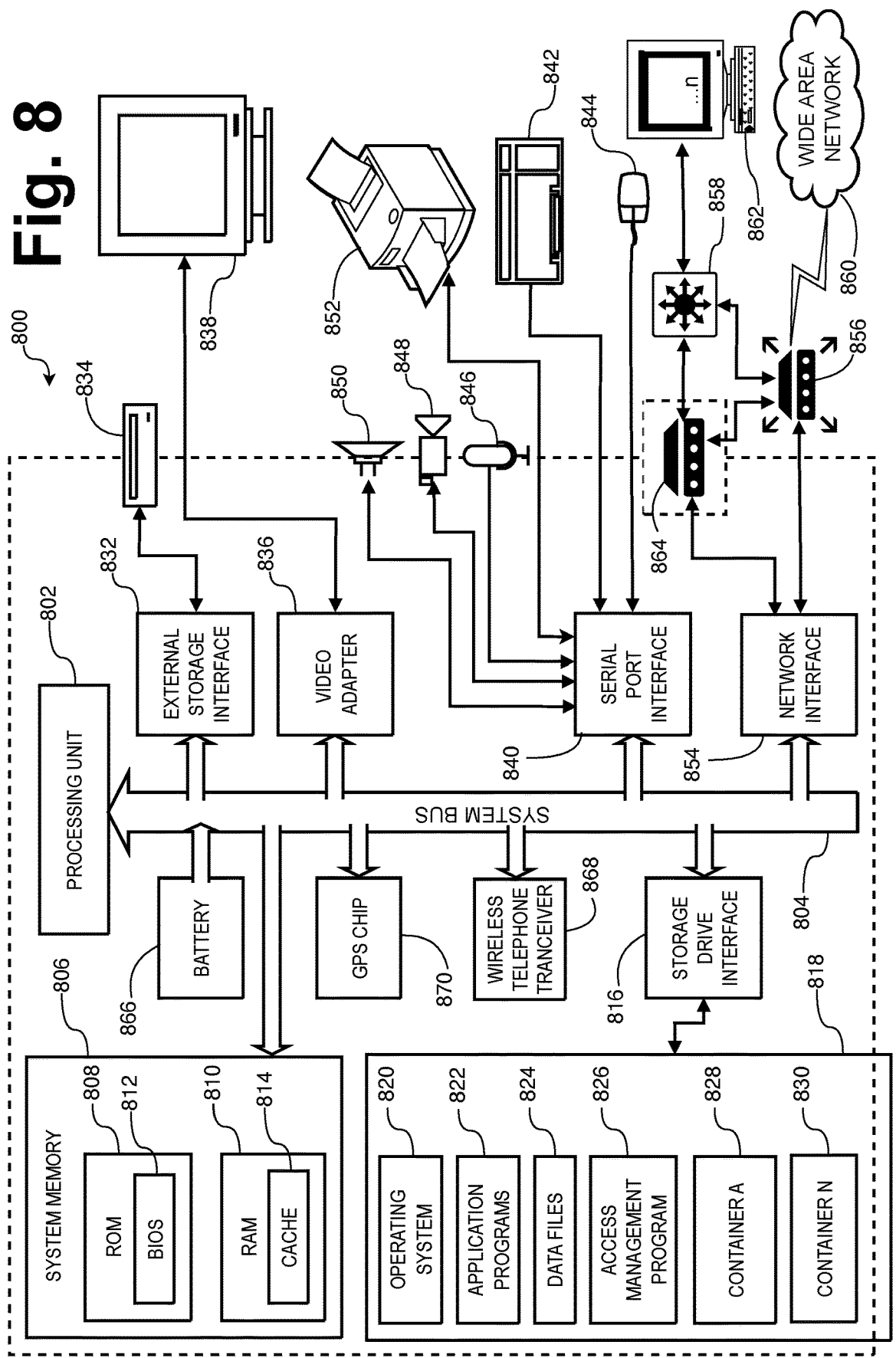

PORT-TO-PORT TUNNEL CREATION FOR SECURE REMOTE ACCESS TO NETWORKED DEVICES

TECHNICAL FIELD

The technology presented herein is generally directed toward a network system configuration and method for granting and controlling secure and limited access by a remote client device to devices on a network, e.g., providing a service vendor an ability to remotely access the networked devices for servicing.

BACKGROUND

The subject matter discussed in the background section should not be assumed to be prior art merely because of its mention herein. Similarly, a problem mentioned in this background section or associated with the subject matter of the background section should not be assumed to have been previously recognized in the prior art.

With the proliferation of network-connected devices and technology, the use of myriad connected devices in both residential and commercial properties performing various systems monitoring, reporting, and security functions has increased. Such premises functions may include, for example and without limitation heating, ventilation, and air conditioning (HVAC), lighting controllers, audio-visual systems, security systems, video surveillance, water heater, gas, electricity, network devices, building automation, appliances, WIFI infrastructure, cellular network boosters, access control, fire panel, and telephony. In large, commercial properties, for example, hotels, hospitals, nursing homes, office buildings, etc., hundreds if not thousands of connected devices may be installed on a premises which increases the complexity of their maintenance. Additionally, a premises operator (e.g., a owner or management company) may be responsible for multiple premises, e.g., a hotel chain, significantly increasing the number of networked devices managed by a premises operator. These functionalities are necessarily supported by multiple vendors.

When a device fails, the premises operator may have to engage multiple people (e.g., facilities management or IT personnel) to identify the root cause of the failure and then contact an appropriate vendor or service provider to come to the premises to identify or troubleshoot and correct or fix the issue. This may cause several trips and unnecessary costs in resolving a problem. Even performance of routine services (e.g., changing HVAC filters) may be missed due to the absence of alerting tools. Further, each connected device category has unique vendors, protocols, installers, and management software and these connected devices require skilled labor for monitoring and maintenance, which is expensive and limited.

Existing monitoring solutions have various compatibility restrictions that are bound to a particular type or manufacturer/brand of connected devices. With the multiplicity of connected devices (HVAC, WIFI, security cameras, etc.), the premises operator is left with a convoluted process to monitor the connected devices on a property, each of which requires domain-specific expertise. Existing monitoring solutions do not generally enable a service vendor to remotely access network connected devices on a premises for service. If remote access is available, existing monitoring solutions rely on a server that acts as a "middleman" to provide remote access, which is expensive to maintain. Further, remote access solutions generally function by providing access to an entire premises network rather than single devices and can therefore pose a security risk.

The information included in this Background section of the specification, including any references cited herein and any description or discussion thereof, is included for technical reference purposes only and is not to be regarded subject matter by which the scope of the invention as defined in the claims is to be bound.

SUMMARY

A system comprising a device and a corresponding method of using the device in conjunction with internet protocols to grant and control secure and limited access to devices on a network by a remote client device are disclosed herein. The device and method are related to the concepts disclosed in International Application No. PCT/IB2021/056262 filed 12 Jul. 2021, which may be referred to for background and understanding of the present disclosure. Implementations of the disclosed system may provide monitoring and maintenance of connected devices in various properties like hotels and other hospitality locations, student living, assisted living, residential homes, apartment buildings, and commercial buildings. The disclosed system monitors all the connected devices in an Internet of Things (IoT) environment, regardless of the device type, brand, and communication protocol. The system may isolate network device failures as they arise and determine the correct vendor to notify for failure resolution.

The disclosed system includes an access control device connected to a local area network (LAN) behind a gateway or network access device (e.g., a router or other network address translator (NAT) device). The access control device may also be communicatively coupled with a plurality of devices connected on the LAN, either directly or via one or more switches, to capture operational data from the connected devices. The access control device instantiates a tunnel through the NAT device associated with the LAN and the NAT device associated with the remote client device. The access control device is configured to establish a port-to-port connection between the remote client device and any selected network device on the LAN that is connected to the remote access device. Port forwarding by the NAT device associated with the LAN is not invoked. The remote access device accesses a secure container environment to which the selected network device is logically assigned and within which the remote client device directly communicates with the selected network device.

The access control device monitors the operational data and transmits alerts to a premises operator upon detection of any failures based on the monitored operational data. The access control device may also be configured to transmit alerts to relevant device maintenance vendors regarding the failures. The vendor alerts may be automatic or may be instigated by the premises operator. With the operator's permission, the vendor may be provided temporary remote access to one or more devices on the premises LAN for troubleshooting, remote repair, or configuration purposes without port forwarding. The access rights may be time limited or cease upon completion of a maintenance activity by the vendor, and may be retracted at any time by the operator. The access control device limits network access of the vendor to only permitted devices; no other devices on the network are visible to or accessible by the vendor.

In one example implementation, a method is provided for providing direct, secure access to a subset of a plurality of devices connected on a local area network to a remote computer device external to the local area network. External access to the local area network is controlled by a network access device. An access control device is connected to the local area network and separately to the subset of the plurality of devices. The method executed by the access control device including transmitting through the network access device a request to the remote computer device to connect to the access control device via an intermediate STUN server using a peer-to-peer connection. A peer-to-peer connection is established between the access control device and the remote computer device. A random service port number is generated to associate with one device of the subset of the plurality of devices. A data packet is created to send to the remote computer device and includes the random service port number in a payload portion of a data packet. The data packet is transmitted over the peer-to-peer connection to the remote computer device including instructions to the remote computer device to include the random service port number in payload portions of any return packets transmitted by the remote computer to the access control device. Return packets are received from the remote computer device over the peer-to-peer connection with the random service port number associated with the one device in the payload portions of the return packets. The payload portions of the return packets received from the remote device are transmitted to the one device to establish a communication tunnel between the remote computer device and the one device without providing the remote computer device direct access to the local area network.

In another example implementation, an access control device is disclosed for use on a local area network to provide direct, secure access to a subset of a plurality of devices connected within the local area network to a remote computer device external to the local area network. External access to the local area network is controlled by a network access device and the access control device. The access control device includes the following: a first network connector for connecting the access control device to the network access device; a second network connector for connecting the access control device to a subnetwork switch connected to the subset of the plurality of devices; a memory storing processing instructions; and a processor configured by the processing instructions in the memory. The configured processor performs the following operations: it transmits through the network access device a request to the remote computer device to connect to the access control device via an intermediate STUN server using a peer-to-peer connection; it establishes a peer-to-peer connection between the access control device and the remote computer device; it generates a random service port number to associate with one device of the subset of the plurality of devices; it creates a data packet to send to the remote computer device and including the random service port number in a payload portion of a data packet; it transmits the data packet over the peer-to-peer connection to the remote computer device including instructions to the remote computer device to include the random service port number in payload portions of any return packets transmitted by the remote computer to the access control device; it receives return packets from the remote computer device over the peer-to-peer connection with the random service port number associated with the one device in the payload portions of the return packets; and it transmits the payload portions of the return packets received from the remote device to the one device to establish a communication tunnel between the remote computer device and the one device without providing the remote computer device direct access to the local area network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto. In some examples, one element may be designed as multiple elements, or multiple elements may be designed as one element. In some examples, an element shown as an internal component of one element may be implemented as an external component in another and vice versa. Furthermore, the elements may not be drawn to scale.

Figure 1:
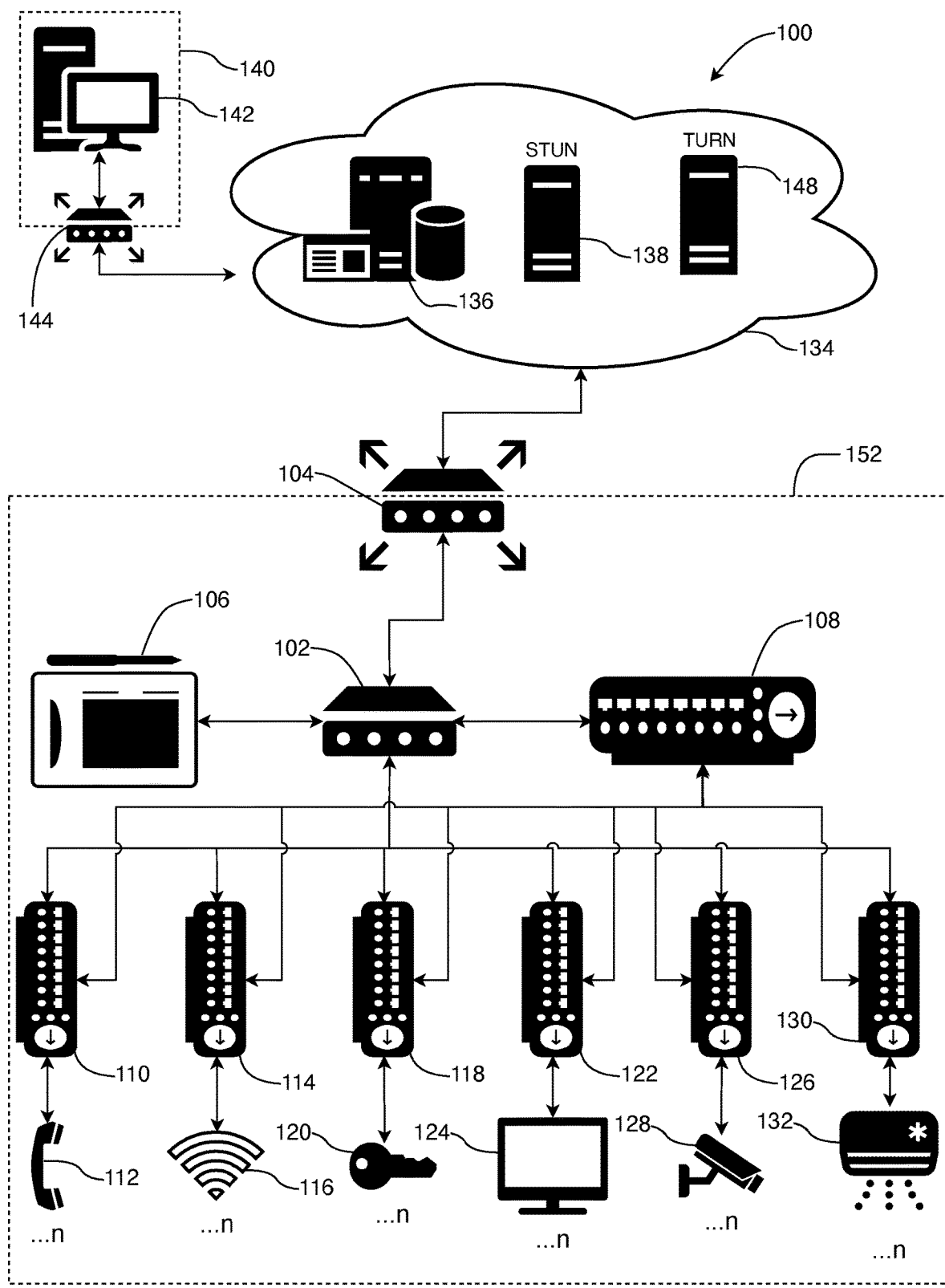

FIG. 1 is a schematic diagram of an exemplary embodiment of a system for monitoring operations, detecting failures, and limiting access for repair of a plurality of connected devices installed on a premises.

Figure 2:
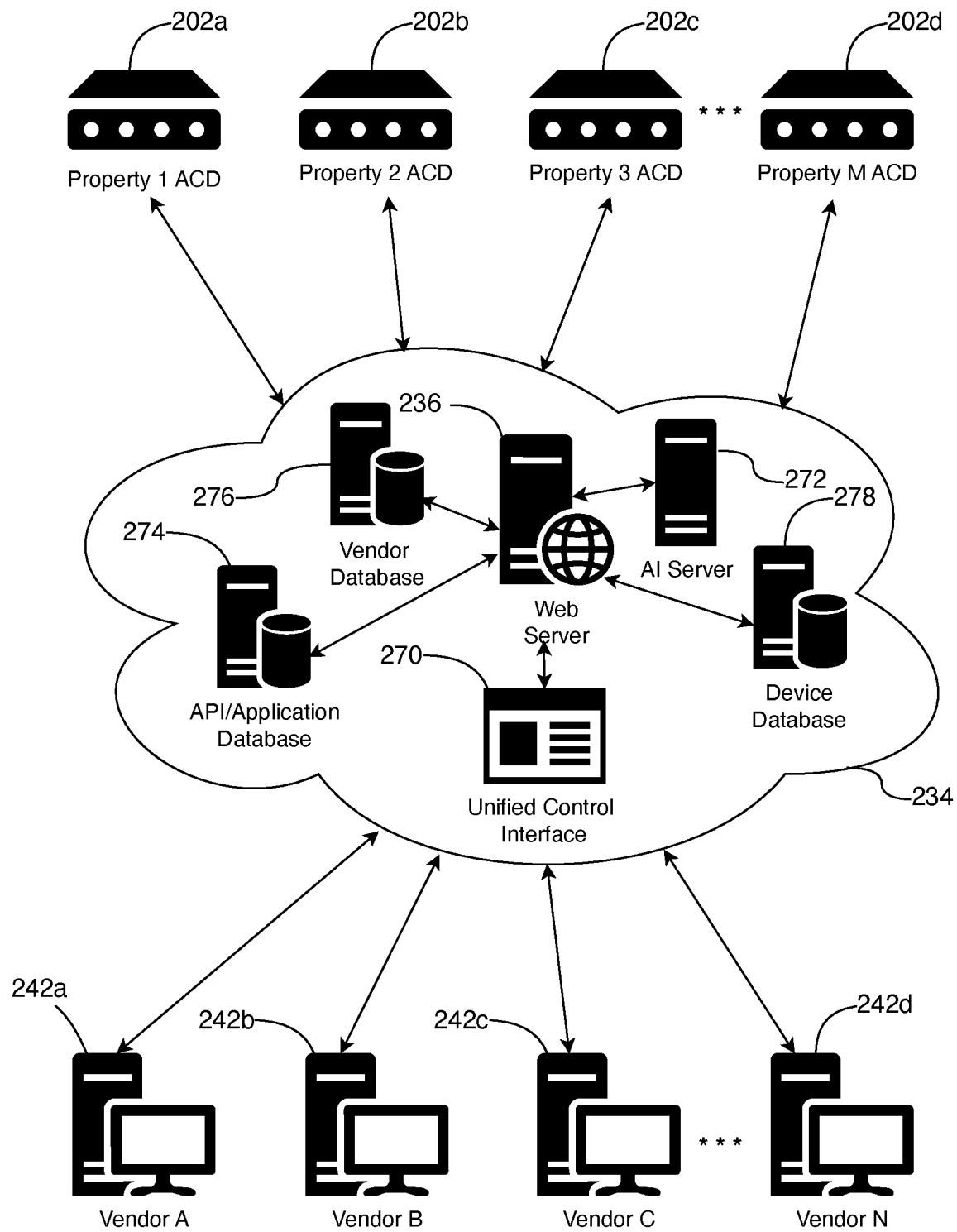

FIG. 2 is a schematic diagram of an embodiment of server architecture of the disclosed system for management of multiple premises by a single proprietor.

Figure 3:
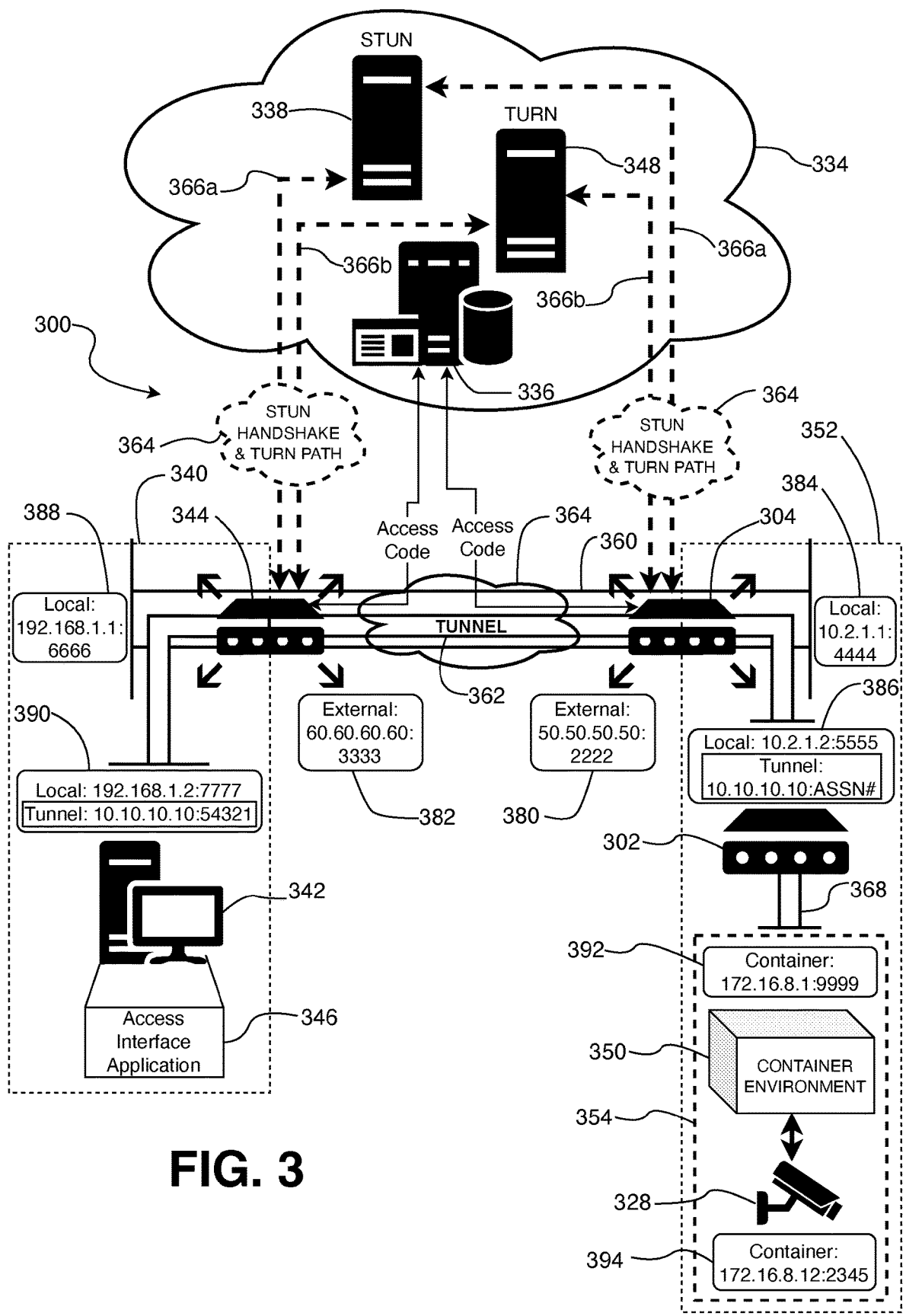

FIG. 3 is a schematic diagram of an embodiment of the disclosed system using intermediate servers and a container environment within an access control device to create a secure UDP tunnel between an external vendor client device and premises devices on a local area network on a managed property.

Figure 4:
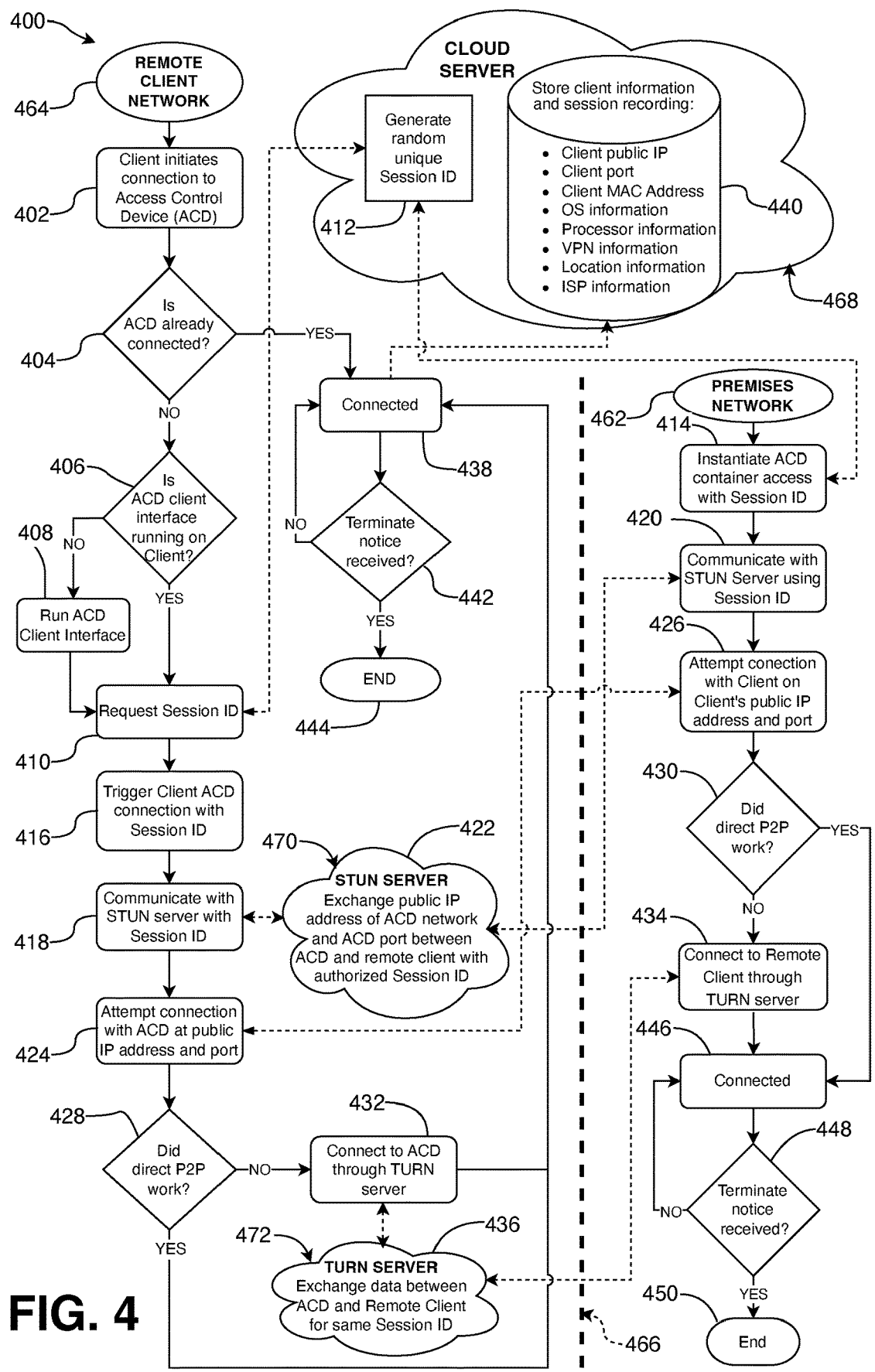

FIG. 4 is a flow diagram of an example method for creating a secure UDP tunnel between an external vendor client device and an access control device managing limited access to premises devices on a local area network on a managed property.

Figure 5:
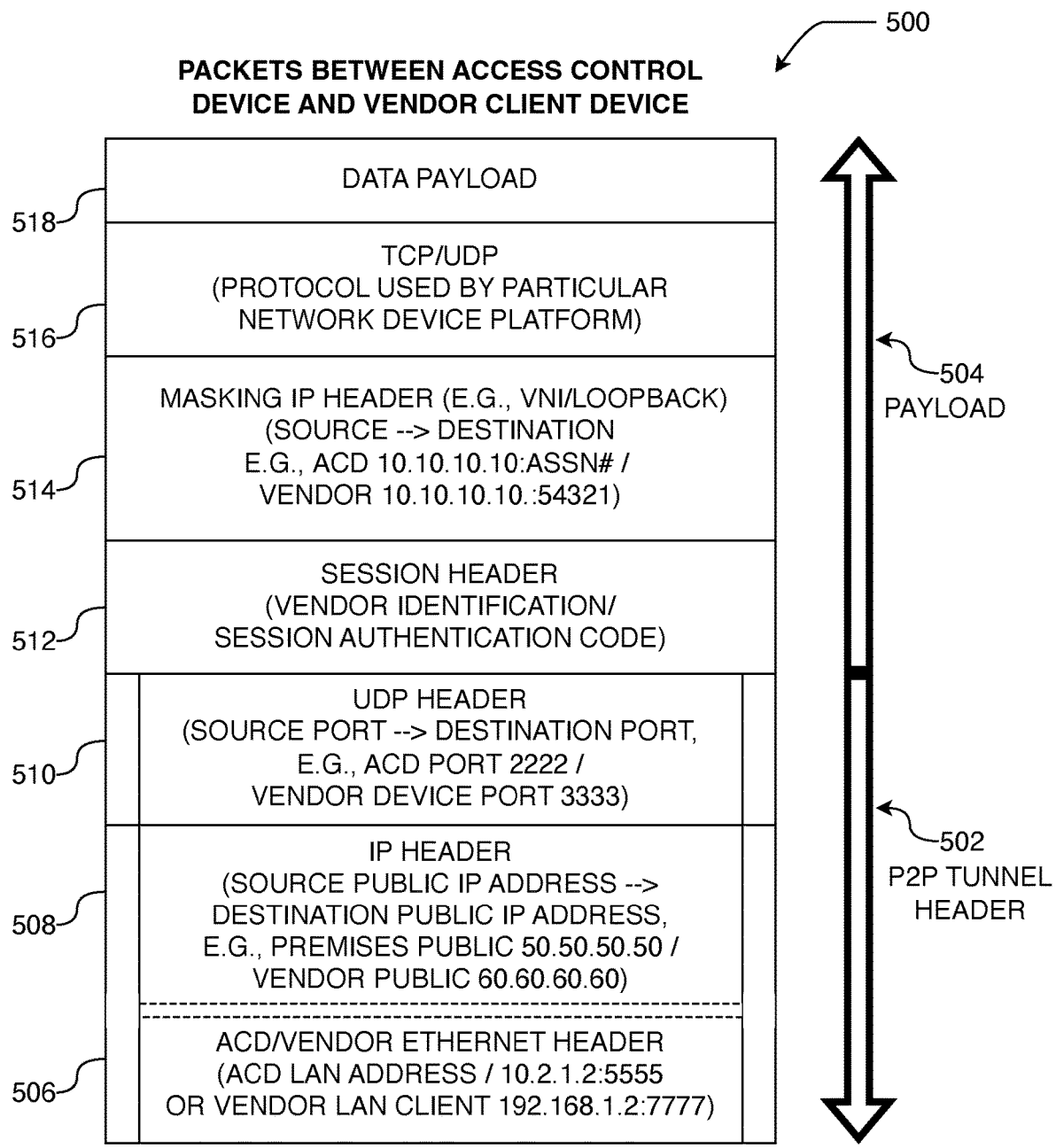

FIG. 5 is a schematic diagram of an exemplary internet protocol packet including a header portion and a payload portion used by the disclosed system to perform the disclosed methods herein.

Figure 6:
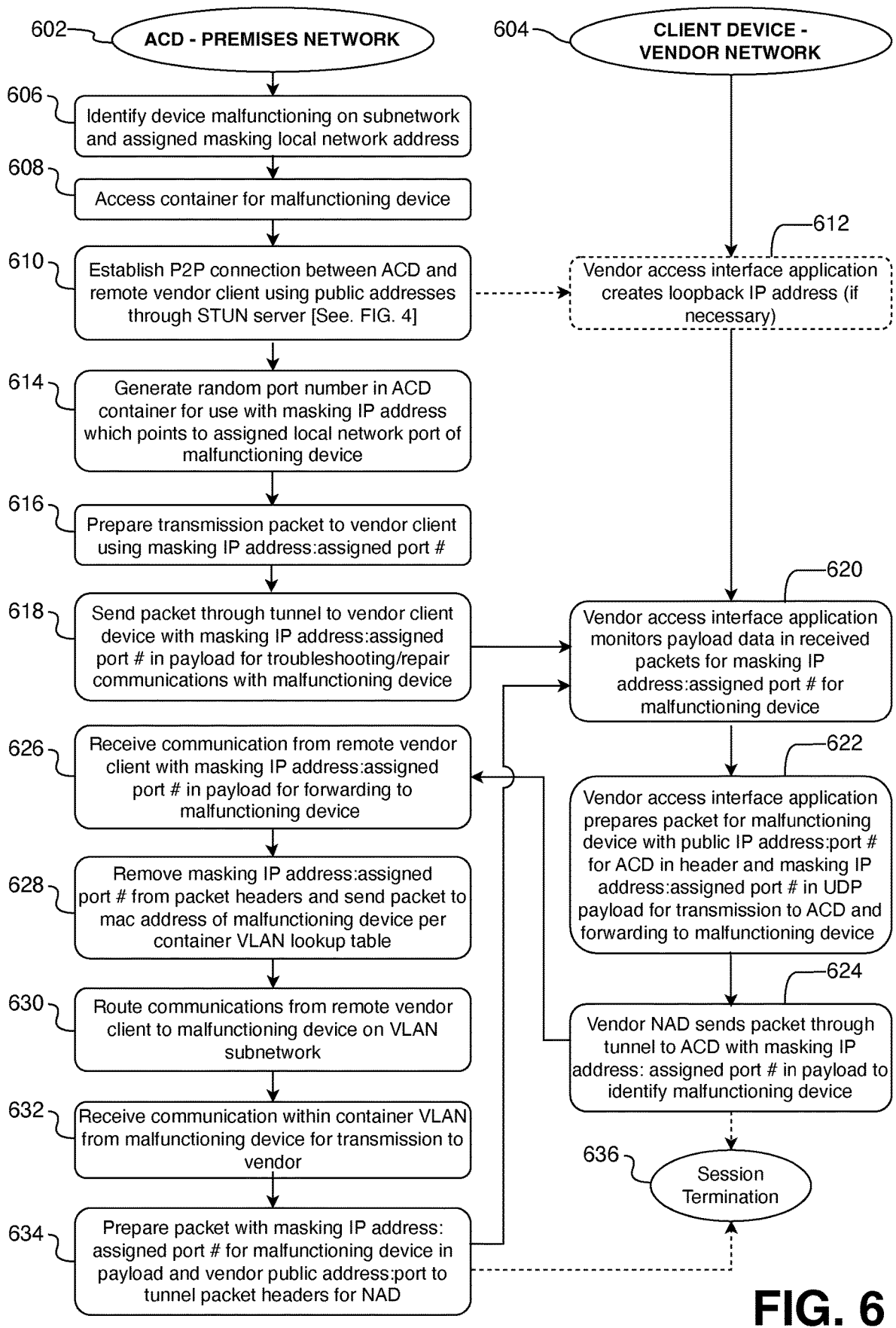

FIG. 6 is a flow diagram of an example method for managing secure and direct communications between an external vendor client device and a premises device on a local area network on a managed property.

Figure 7:
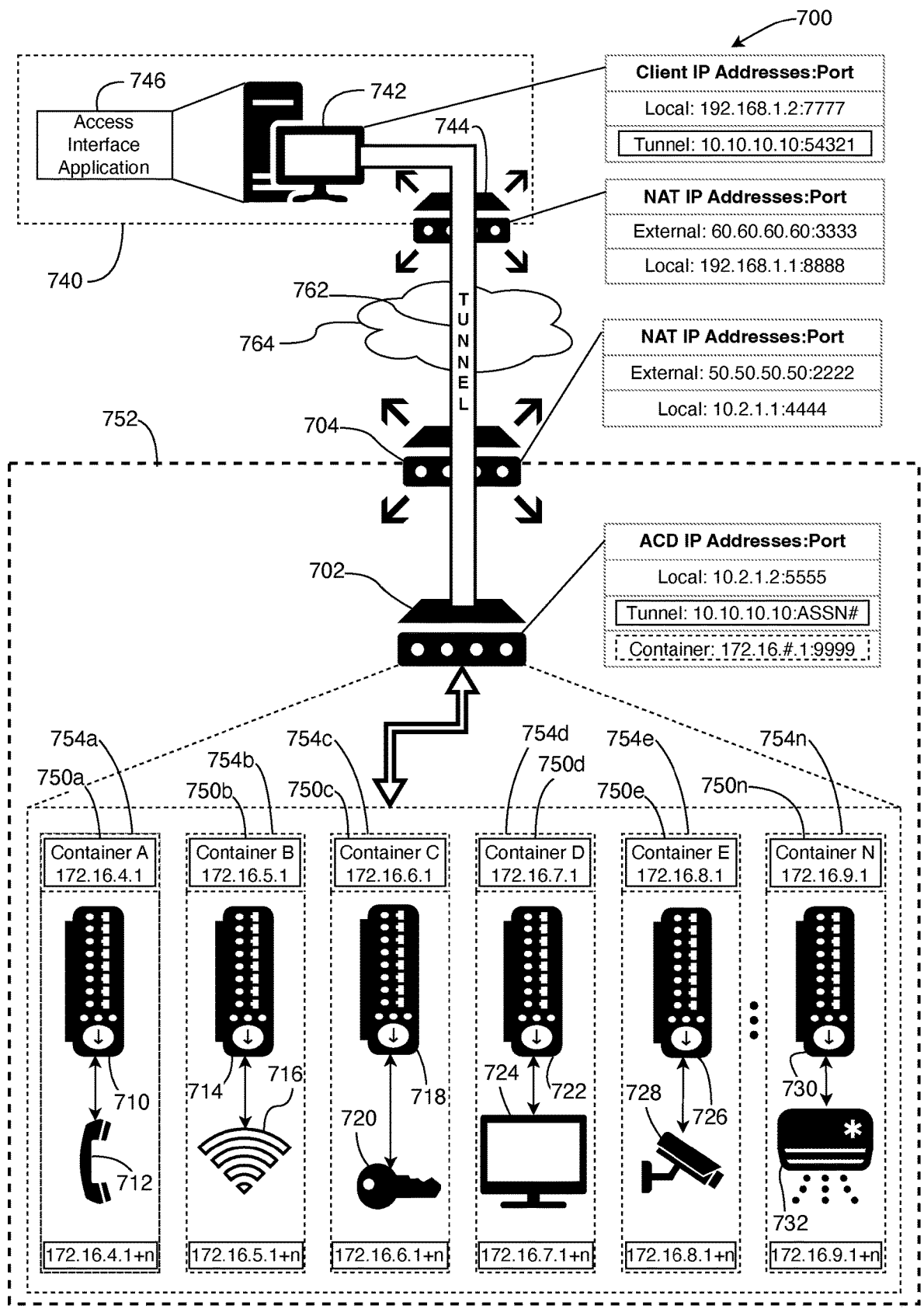

FIG. 7 is a schematic diagram of an embodiment of the disclosed system using a container environment within an access control device to limit communication between an external vendor client device and premises devices on a local area network on a managed property.

FIG. 8 is a schematic diagram of exemplary components of a computer embodiment of an access control device as disclosed herein.

DETAILED DESCRIPTION

Various embodiments of the disclosed system and method are discussed herein with reference to the accompanying figures. However, those skilled in the art will readily appreciate that the disclosed system and method may be implemented in other manners or with additional or fewer features or components than the described embodiments depending upon the needs of a particular application. Therefore, additional approaches to implement the disclosed system and method than the implementation choices in the following embodiments are contemplated and are considered to be within the scope of the claims.

FIG. 1 is a schematic diagram illustrating an example network installation 100 of a plurality of devices installed on premises such as hotels, residential apartment buildings, commercial buildings, hospitals, warehouses, etc., and connected via a local area network 152, also referred to herein as the "premises network". The disclosed network installation 100 includes an access control device 102 communicatively coupled with the plurality of connected devices on the premises network 152 to monitor operational data from and detect failures of the connected devices. In an exemplary implementation, the access control device 102 may be installed in a centrally managed commercial building, e.g., a hotel, student living, an apartment, an assisted living premises, or an office building. These properties have a large array of connected devices which may include, but are not limited to, wireless access points (WAPs), network gateways and switches, computer servers, client computers, Point of Sale (POS) systems, interface devices, telephone systems, IPTV management systems, energy management systems, automation systems, HVAC systems, water boilers, and security systems. All these different systems can be connected to the access control device 102.

The access control device 102 may be a special purpose computer device (as further described herein with respect to FIG. 7) including a processor, memory for instantiation of software applications, data storage, and communication connections (e.g., ethernet ports, universal serial bus (USB) ports, etc.) for connecting the access control device 102 to the premises network 152. The access control device 102 may be connected with a user interface device 106 such as a tablet, a smartphone, a desktop computer, a laptop computer, or other similar device via an electrical communication to control functionality of the access control devices 102 to provide a device management interface for a premises operator and display the operational data captured from the connected devices. In some implementations, a user interface may be integrated within the access control device 102.

The access control device 102 may be communicatively coupled with a core switch 108 (e.g., an Ethernet switch) and one or more additional switches (e.g., Ethernet switches) for subnetworks of like devices managed on a premises. Additionally, each of the subnetwork switches may be connected with the core switch 108. For example, a first subnetwork switch 110 may be connected to a plurality of telephone devices on a premises telephone network 112 (e.g., a private branch exchange (PBX)). A second subnetwork switch 114 may be connected to a plurality of wireless router devices on a premises WiFi network 116 (e.g., an extended network or a mesh network). A third subnetwork switch 118 may be connected to a plurality of keyless door lock devices (e.g., magnetic card or smart phone activated door locks on a hotel property) on a door security network 120. A fourth subnetwork switch 122 may be connected to a plurality of televisions on a premises hospitality video distribution network 124. A fifth subnetwork switch 126 may be connected to a plurality of security camera devices (e.g., video cameras, digital video recorders (DVR). and network video recorders (NVR)) on a closed-circuit security camera network 128. A sixth subnetwork switch 130 may be connected to a plurality of heating/cooling units, thermostats, or other HVAC devices on a premises Building Automation and Control network (BACnet) 132. Other BACnet-enabled devices (e.g., lighting systems, fire suppression systems, security systems, power management systems, boiler systems, etc.) may also be connected to one or more BACnet subnetworks. The BACnet devices 132 use IP addresses and Ethernet MAC addresses just like other UDP/IP network devices. Further, the BACnet devices 132 may transmit their operational data to the subnetwork switch 130 for the BACnet 132 at will and allow the subnetwork switch 130 to deal with packet collisions and retries as needed.

The subnetworks represented in FIG. 1 and described herein are merely examples of possible network systems on a premises. Any number of other premises systems (e.g., lighting controllers, audio-visual systems, security systems, building automation, appliances, cellular network boosters, fire panels/alarms) may also be connected via subnetwork switches to the access control device and the core Ethernet switch 108. Connections between the access control device 102, the core Ethernet switch 108, and the subnetwork switches 110, 114, 118, 122, 126, 130 may be made over any of a type of physical or wireless connections. Possible connection options may include, but are not limited to, Ethernet, Wireless Local Area Network (WLAN), Bluetooth, Zigbee, Long Term Evolution (LTE), Worldwide Interoperability for Microwave Access (WiMAX), and General Packet Radio Service (GPRS).

The core Ethernet switch 108 may interconnect with the plurality of subnetworks 112, 116, 120, 124, 128, 132 to provide a compact, programmable, and scalable core and aggregation of network devices for enterprise environments. As indicated, the plurality of subnetworks 112, 116, 120, 124, 128, 132 is not limited to the examples shown and any number (n) of networks may be connected and managed. Each of the subnetwork switches 110, 114, 118, 122, 126, 130 may provide a connection between a plurality of network devices such as devices on subnetworks 112, 116, 120, 124, 128, 132, respectively, over physical or wireless networks. The core switch 108 receives communication data from each of the subnetwork switches 110, 114, 118, 122, 126, 130 to handle multiple data transmissions between devices on the subnetworks 112, 116, 120, 124, 128, 132 simultaneously for local device monitoring and control through separate control system software via one or more client computer devices on the LAN or via an integrated management platform executed on the access control device 102.

An integrated management platform on the access control device 102, for example, as disclosed in PCT application no. PCT/IB2021/056262, may use a library of protocols and application programming interfaces (APIs) to communicate with all the devices on the subnetworks 112, 116, 120, 124, 128, 132 to determine whether the devices are functioning properly and, if not, determine the point of failure, suggest troubleshooting steps, and provide vendor support information that is specific to the system of devices. For example, at regular intervals (e.g., every 60 seconds) the access control device 102 can check the "heartbeat" of every device on all of the subnetworks 112, 116, 120, 124, 128, 132 to determine whether each device is functioning at a base level. The heartbeat check can be performed by sending Address Resolution Protocol (ARP) requests on the network and monitor for replies from all container devices. If an expected reply is not received, further diagnostic testing may be initiated. Additionally, the access control device 102 can be configured to regularly schedule use of device-specific tools to check the status of sensors or parameter values associated with a particular type of device. If any of the values are outside of known norms, the access control device 102 may first recheck to avoid a false alarm. Other parameters may also be verified, e.g., through domain name system (DNS) checks, Internet service provider (ISP) checks, dependency checks (e.g., when one ISP is used for multiple subnetworks). Furthermore, the access control device 102 may send regular diagnostic information about different systems of devices to their respective service vendors.

As shown in FIG. 1, the access control device 102 is positioned between a gateway or network access device 104 (e.g., an Internet modem and network address translator, i.e., router, either combined or separate) and the core switch 108 such that all traffic between on the premises network 152 coordinated by the core switch 108 must pass through the access control device 102 before being transmitted to an external network, e.g., the Internet 134. Similarly, the access control device 102 receives all incoming traffic to determine whether the communication is directed to a device on a restricted subnetwork as described herein. If the packet header indicates the traffic is not directed to a restricted subnetwork or device, the access control device 302 will pass the packet to the core switch 108 for appropriate routing on the local premises network 152.

The management platform on the access control device 102 may be configured to restrict and control access from external networks to devices on the subnetworks 112, 116, 120, 124, 128, 132, and to any other subnetworks for which regulated access is desired. Similarly, the access control device 102 may prevent outbound communications from devices on restricted subnetworks 112, 116, 120, 124, 128, 132 from being forwarded to and transmitted by the network access device 104 to external networks. Restriction may be based upon registration of device LAN IP addresses or MAC addresses within a database in the management platform on the access control device 102. For subnetworks on the premises network 152 that are not subject to heightened restriction, e.g., desktop computers, laptops, tablets, smartphones, etc. of premises personnel or guests, the access control device 102 will simply allow such traffic from the core switch 108 to pass to the network access device 104.

FIG. 1 additionally depicts external network components used in conjunction with the access control device 102 to provide secure and limited communications between third party devices at remote locations 140, e.g., repair vendor client devices 142 invited to conduct a trouble shooting or repair session for a malfunctioning premises device by a premises manager. As shown, the vendor client device 142 at the remote location 140 also sits behind a network access device 144 for its own local network. A web server 136 (either at a single location or distributed, e.g., via Amazon Web Services) may provide credentials for vendors upon receipt of service requests from a premises, and manage validation of credentials, provide general data and device information to vendors, and provide other services as further described herein. A STUN (Session Traversal of User Datagram Protocol [UDP] Through Network Address Translators [NATs]) server 138 may be additionally used to establish communication between a vendor client device 142 and one of the devices on a premises subnetwork 112, 116, 120, 124, 128, 132 via the access control device 102 as further described herein. Alternatively, a TURN (Traversal Using Relays around NAT) server 148 may be used to establish communication between a vendor client device 142 and one of the devices on a premises subnetwork 112, 116, 120, 124, 128, 132 via the access control device 102 as further described herein.

FIG. 2 is a schematic diagram of an exemplary server architecture 200 of the disclosed system, in accordance with an example implementation. As indicated in FIG. 2, various access control devices 202a, 202b, 202c, and 202d may be installed at various geographically separated sites (e.g., Properties A, B, C, . . . . M). The access control devices 202a, 202b, 202c, and 202d may be connected to a cloud network 234 over the Internet. Similarly, any number of vendor client devices 242a, 242b, 242c, 242d at various geographically separated sites may be connected to the cloud network 234. The vendor client devices 242a, 242b, 242c, 242d represent any of a number of repaid vendors, e.g., a telephone system repair vendor, an HVAC system repaid vendor, etc.

The cloud network 234 may include a web server 236, a machine learning/artificial intelligence (AI) server 272, an application database 274, a vendor database 276, and a device database 278. The machine learning server 272 may receive operational data from various devices and premises and process algorithms to identify common issues and solutions to device and network problems. When faults or failures are detected in any connected device, the machine learning server 272 can also suggest resolution options. The application database 274 may provide a repository of applications for use by vendors to diagnose and repair problems with devices on premises networks. The APIs from the application database 274 may, for example, integrate with property management software to provide real-time status of each system. The vendor database 276 may provide a repository of vendors and contact information for use by premises owners to assign device management authority for premises devices under their control. The device database 278 may provide an extensive library of device information for use by vendors in identifying, troubleshooting, and repairing various makes and models of devices on a premises.

The web server 236 may also host a number of unified controllers 270, e.g., one for each vendor client device 242a, 242b, 242c, 242d that may have service contracts at a plurality of premises sites, or one for a premises owner of a number of the premises sites. The unified controllers 270 may be software instantiations that monitor the operational data and transmit alerts to the premises owners as well as the relevant vendors upon detecting any failures based on the monitored operational data from access control devices 202*a*, 202*b*, 202*c*, and 202*d* across multiple ones of the premises locations. Vendors may access, view, and manage only the connected devices among the premises locations assigned to them within the system interface. The vendor may be provided temporary access to any connected device assigned to the vendor for a stipulated time or under stated rules or conditions as set by the premises owner as further described herein.

Each access control device 202*a*, 202*b*, 202*c*, and 202*d* may transmit operational information to the webserver 220 and receive information from the web server 236 specific to devices or operational issues occurring at the specific premises. The web server 236 receives captured operational data from the access control devices 202*a*, 202*b*, 202*c*, and 202*d* and may transmit the operational data to the machine learning server 272, and the device database 278 to populate a centralized repository of common issues and solutions to device and network problems that can be shared among all the access control devices 202*a*, 202*b*, 202*c*, and 202*d*.

The diagram of FIG. 3 depicts an exemplary secure TCP tunnel created by the system 300 using an embodiment of a method 400 described in in conjunction with FIG. 4. The method 400 manages and authorizes limited access to devices on the premises network 352 using an access control device 302. The methodology of FIG. 4 may also be understood as a unique variation on the process of creating a peer-to-peer (P2P) connection between two client devices (hosts) on separate remote networks with local network access managed by network access devices 304, 344. In this implementation, a secure and limited peer-to-peer connection is created between the remote vendor device 342 on a remote client network 340 and the access control device 302 on the premises network 352 behind their respective network access devices 344, 304.

As indicated, the access control device 302 preferably connects behind the network access device 304 with network address translation (NAT) functionality (or further behind a separate NAT router) on the LAN providing the public IP address and port forwarding service to devices on the premises network 352, including the access control device 302. However, in some implementations, the access control device 302 may be configured to operate as a NAT with a direct Internet connection through a secondary or a backup ISP with a public IP address as a backup should the network access device 304 fail. For example, the access control device 302 may have a backup lithium-ion battery or be connected to an external, uninterruptable power source, and further have a mobile telephone transceiver chip to access a wireless telephone network to maintain access to devices under its control on the premises LAN 352. This powered backup system may allow a remote vendor to troubleshoot issues on the premises LAN 352 even when the network access device 304 is compromised or offline.

Additionally, as a further security measure, the access control device 302 may be provisioned with a global positioning system (GPS) transceiver chipset to provide physical location information about the access control device 302. For example, if the access control device 302 is removed from a premises by a bad actor in an attempt to spoof the premises network 352 from a remote location, the location information provided by the GPS chip could operate to automatically lock the access control device 302 upon indication that the access control device 302 is no longer physically at the premises. Alternatively, information about changes in GPS location could be relayed to a central system monitor, e.g., the web server 136, 236, 336, to alert a premises operator of the movement of the access control device 302. Further, the battery, wireless transceiver, and GPS chip could be configured to operate independently to provide updated location information for recovery of the access control device 302 upon being removed from a premises. In another implementation, the access control device 302 could be configured to prevent initial operation until the GP chip indicates that it is at the appropriate premises. Such a configuration could prevent unauthorized use of the access control device 302 in the event that it is intercepted in transit to a new premises by a bad actor.

As presented in FIG. 4, to establish a direct connection between the remote vendor device 342 and the access control device 302, certain steps must be taken by each device on both the premises network 352, 462 and the remote client network 340, 464, and further through interaction with one or more remote cloud servers 468 (e.g., web server 336 in FIG. 3), STUN server 470 (corresponding to STUN server 338 in FIG. 3), and TURN server 472 (corresponding to TURN server 348 in FIG. 3). The web server 336, STUN server 338, and TURN server 348 are all shown on the same cloud network 334 in FIG. 3; however, each of these servers could be hosted at different physical locations, or the services provided by each could be spread across multiple physical devices, or they could all be hosted on the same server device, as long as the server or servers are publicly accessible over the Internet.

The logic flow in the diagram of FIG. 4 moves between actions on the remote client network 464 and the premises network 462, which are shown separated by dashed line 466. Initially, a client software application, hereinafter referred to as the "access interface application 346", is installed on the vendor device 342 on the remote client network 340, 464 to communicate with the access control device 302 on the premises network 352, 462 and ultimately receive access to a malfunctioning device on a premises subnetwork. The access interface application 346 may also provide an interface for the service vendor to view the status of devices on one or more premises subnetworks for which the vendor has service contracts (e.g., devices allocated to a container instantiated by the access control device 302 and assigned to the vendor), research specifications and repair protocols, access APIs and tools for communicating with devices on premises networks, and more. The access interface application 346 may provide this functionality through communication with the web server 336, which is a central component of the overall premises device management platform.

Connection between the remote client device 342 on the remote client network 340, 464 and the access control device 302 on the premises network 352, 462 is initiated at the client device 342 in operation 402, e.g., when the access interface application 346 receives notice of a malfunction of a device on a premises network from the web server 336. This notification can also be sent via electronic mail, text messages, or automatic telephone calls to contact addresses or numbers associated with the vendor profile and corresponding the particular premises. These communications are sent between the network access devices 304, 344 via standard TCP/IP protocol communication links 360 over the internet 364. This contact information may be stored in a data repository associated with the web server 336 (e.g., the vendor database 276 shown in and discussed with respect to FIG. 2). When the monitoring functionality of the access control device 302 on the premises network 352, 462 identifies a malfunctioning device, it alerts the web server 336 to contact the appropriate vendor for service. Regardless of the method of malfunction notification, the vendor responds to the notification through an interface provided by the access interface application 346 in contact with the web server 336.

The logic on the access interface application 346 on the vendor client device 342 first determines whether a connection is already presently established with the identified access control device 302 as indicated in operation 404. Such a connection could be active due to a prior session troubleshooting another device on the same premises network 462 still in progress. If it is determined that a direct connection with the access control device 302 already exists, the process moves directly to operation 438 indicating present and persistent connection. If there is no present connection with the access control device, the process determines in operation 406 whether the appropriate session interface module of the access interface application 346 is running or selected on the client device 342. If the proper interface has not been instantiated, the access interface application 346 launches the interface for connection with the access control device 302 as indicated in operation 408.

Once the connection interface is operational (or if it was already operational), the process proceeds to request authorization, e.g., a session ID, from the cloud sever 468 (e.g., web server 336), as indicated in operation 410, to allow the client device 342 to connect with the access control device 302 and ultimately to the specific malfunctioning device on the premises network 462. The session ID request is transmitted to the web server 336 over the standard TCP/IP communication link 360 across the internet 364. The session ID request may contain identification information about the vendor as well as identification information about the premises and malfunction, e.g., an embedded ticket number in the initial service request generated by the web server 336. When the cloud server 468 receives the session ID request with the proper ticket information, the cloud server 468 generates a random, unique session ID code as indicated in operation 412. This session ID code may embody several attributes. It foremost provides the necessary authorization for the vendor client device 342 to establish a secure and direct communication connection with the access control device 302. It may further have a time limit associated with its validity, e.g., it may expire after a set time and, if a connection is not initiated within the period, the vendor client device 342 may have to request a new session ID code. Additionally, the session ID code may indicate a maximum dwell time for a session related to the specific malfunctioning device once a connection with the access control device 302 is achieved. Once the dwell time expires, the connection between the vendor client device 342 and the access control device 302 may automatically terminate, regardless of the status of repair. This provides an added measure of security to the premises network 352, 462 by preventing malicious actors from having unlimited time to attempt to access other parts of the premises network 352, 462 once the connection with the access control device 302 is established.

Simultaneous with the transmission of the session ID code to the vendor client device 342, the cloud server 468 also transmits the session ID code to the access control device 302 as part of operation 412. Receipt of the session ID code prompts the access control device 302 to access the appropriate container 350 (described in greater detail further herein) for the vendor and the malfunctioning device on the premises network 462 as indicated in operation 414. Once the vendor client device 342 receives the session ID code, the access interface application 346 triggers a client-side connection attempt with the access control device 302 using the session ID code as indicated in operation 416. An initial attempt to create a direct, peer-to-peer connection with the access control device 302 may be through communication with a STUN server 338, 470 that is part of the premises access platform as indicated in operation 418. When communicating with the STUN server 338, 470, the vendor client device 342 provides the session ID code. At approximately the same time, the access control device 302 also attempts to communicate with the STUN server 338, 470 using the identical session ID code received from the cloud server 468. Again, these communications are made over a standard TCP/IP communication link 360 over the internet 364.

In contrast to public servers (e.g., a Google or Bing search engine server), peer host devices (e.g., the vendor client device 342 and the access control device 302) on different local networks (i.e., the remote client network 340, 464 and the premises network 352, 462, respectively), do not have static external IP addresses and cannot typically be directly reached. As shown in FIG. 3, and solely for purposes of example, the network access devices 304, 344 are each provided with a public IP address by their internet service provider (ISP). These public IP addresses may be static and unchanging or they may be dynamically assigned and changed at intervals by the ISP. In the example of FIG. 3, the network access device 304 on the premises network has been assigned public IP address 50.50.50.50 (see address indicator 380) and the network access device on the client network 340 has been assigned public IP address 60.60.60.60 (see address indicator 382). Example port numbers :2222 and :3333 are also shown indicating service ports assigned by the respective network access devices 304, 344 for communication with the STUN server 338, 470. The port number :2222 is used by the premises network access device 304 to identify and designate traffic to be directed to the access control device. Similarly, the port number :3333 is used by the vendor network access device 344 to identify and designate traffic to be directed to the access interface application 346 running on the vendor client device 342.

However, all devices connected to each of the local area networks behind each of the network access devices 304, 344 are assigned a standard local network IP address. In the example shown in FIG. 3, the form of the local network IP address for the network access device 304 on the premises network 352 is depicted as 10.2.2.1:4444 (see address indicator 384), where 0.1 is the device number the network access device 304 assigns itself on the premises network 352 and where service port 4444 is assigned for communication with the access control device 302 on the premises LAN 352 As is known in network communications, port numbers may be assigned to ensure traffic is appropriately routed on a LAN. For example, a device could be running two applications that need to send or receive data across the LAN, for example, a word processing program that needs to open or save a file on a file server and an e-mail program that needs to send and receive messages to and from a mail server. Separate port numbers (e.g., up to 5 digits after the colon in the local IP addresses shown in FIG. 3) can be assigned for traffic to and from each application on running on a particular device so that the data can be provided to the appropriate application. The NAT application on the network access device 304 keeps track of the assigned device IP addresses and port numbers on the LAN (which may be static or perpetual assignments, or dynamically assigned) and corresponding external port numbers assigned for communication outside the LAN, e.g., through use of a look-up table.

Other devices on the premises network 352 are assigned local IP addresses with different device number. For example, the access control device 302 is depicted with a local IP address of 10.2.1.2 (see address indicator 386), where the final number in the IP address, 0.2, distinguishes the access control device 302 from the network access device 304 (and other devices) on the premises network 352. The example local IP address of the access control device 302 also includes a service port number 5555, which is the port number the access control device 302 assigns itself for communications with the network access device 304.

Similarly, the form of the local network IP address for the network access device 344 on the remote client network 340 is depicted as 192.168.1.1:6666 (see address indicator 388), where the final number in the IP address, 0.1, is the device number the network access device 344 assigns itself on the remote client network 344 and where service port 54321 is assigned for communication with the vendor client device 342. The vendor client device 342 is depicted with a local IP address of 198.168.1.2 (see address indicator 390), where the final number in the IP address, 0.2, distinguishes the vendor client device 342 from the network access device 344 (and other devices) on the remote client network 340. The example local IP address of the vendor client device 342 also includes a service port number 7777, which is the port number the operating system of the vendor client device 342 assigns for communications between the access interface application 346 and the network access device 344. The NAT application on the network access device 344 keeps track of the assigned device IP addresses and port numbers on the vendor LAN 340 (which may be static or perpetual assignments, or dynamically assigned) and corresponding external port numbers assigned for communication outside the LAN, e.g., through use of a look-up table.

When a host device needs to contact a public service on the Internet (e.g., a browser application on a client computer needing to reach a search service or a web site, or a mail server on another network), the NAT application in the network access devices 304, 344 swaps the local IP address in the packet header information for the public IP address assigned to the network access devices 304, 344 by the ISP as the source address in the packet header before sending the packet for transmission across the Internet. By swapping the IP addresses, the destination server will know the public IP address of the source network to send return messages. The NAT application also replaces the port number in the outbound packet header to provide a unique port number to ensure proper routing of return traffic from the destination service on the Internet. For example, if multiple computers on the local area network use the same default port number (80) for web services, then the NAT application would not know which computer should receive return traffic if all source IP addresses in packet headers used port 80. Therefore, the NAT application assigns unique public port numbers for outbound traffic corresponding to unique local network IP address: port combinations. The assigned public port numbers are all stored in a relationship look-up table so that when packets are returned, the unique port numbers will be translated to the correct local device IP address and port number for the service.

As will be apparent from this review of standard IP protocol, peer devices (e.g., two host computers) on separate networks have no way to find or communicate directly with each other because they are hidden within their respective local area networks behind the network access devices 304, 344. For example, for typical computer users, a primary communication between peer devices on different networks may be e-mail, which travels between at least two public servers (e.g., a Google Gmail server and a Microsoft Outlook mail server), which may or may not be on the local networks of the peer devices. Regardless, the peer devices do not communicate directly with each other. In order for two peer devices on separate networks to communicate more directly (without a public server passing messages back and forth), they need to find each other. This is the purpose of the STUN server 338, 470, i.e., to ultimately create a peer-to-peer (P2P) connection between devices on different networks.

In the present implementation, each of the vendor client device 342 and the access control device 302 contact the STUN server 338, 470 for the system 300, e.g., via paths 366a over the internet 364, generally simultaneously upon receipt of the session ID code. The public address of the STUN server 338, 470 is known by the cloud server 336, 468 and may be provided to each of the vendor client device 342 and the access control device 302 in conjunction with the session ID code. Alternatively, the public IP address of the STUN server 338, 470 may be saved as part of the local application data of the access interface application 346 on the vendor client device 342 and also on the access control device 302. As per protocol the packet headers of the messages from the vendor client device 342 and the access control device 302, as forwarded by the network access devices 304, 344 to the STUN server 338, are stripped of their LAN IP address, which are replaced by the public IP addresses of the respective networks (e.g., 60.60.60.60 and 55.50.50.50 as shown in FIG. 3). The respective port numbers 2222 and 3333 are also assigned and recorded against the LAN IP addresses and port numbers for the access control device 302 and the access interface application 346 in respective look-up tables by the network access devices 304, 344.

The packet data payloads also include the session ID code. When the STUN server 338, 470 recognizes packets with identical session ID codes from two different public IP addresses, the STUN server 338, 470 responds to each of the vendor client device 342 and the access control device 302 by providing the respective public IP address and assigned external port numbers of the other device in the data payload as indicated in operation 422. Provision of this public IP address information for the respective networks is necessary because the NAT applications of the network access devices 304, 344 strip the source public IP headers from received packets and replace them with the local IP address: port number for transmission of the messages to the correct devices on the respective LANs. The session ID code provides an added layer of security; the STUN server 338, 470 will not provide the public IP address information to other devices without the correct session ID code.

The access interface application 346 on the vendor client device 342 and the access control device 302 behind their respective network access devices 304, 344, now knowing the public IP address and port of each other, attempt to send messages directly to each other through their network access devices 304, 344, without intermediate servers. Because the STUN server 338, 470 was communicating with the access control device 302 and the vendor client device 342 within a few seconds or less before the present direct communication attempts, their respective network access devices 304, 344 still consider any messages received with a destination IP address: port corresponding to the source IP address: port it sent to the STUN server 338, 470 as continuing to originate from that public STUN server 338, 470 and will forward messages received directly from the remote host device to the local host device (e.g., from the vendor client device 342 to the access control device 302 and vice versa), thus creating a tunnel connection 362 across the internet 364. (Note: The network access devices 304, 344 still translate the external IP addresses to the internal IP address: port of the access control device 302 and the vendor client device 342 on the respective local area networks 352, 340 based upon the external port numbers assigned, but the traffic is now "direct" without an intermediate server.)

The tunnel connection 362 may primarily transport communication traffic between the access control device 302 and the vendor client device 342 using user datagram protocol (UDP), which is faster than transmission control protocol (TCP) because it does not use the more extensive data integrity checks of TCP. UDP is a more appropriate transport protocol for primarily receiving diagnostic data or mirroring the diagnostic tool interface resident in the firmware of the network device, which is a primary purpose of the present implementation. To maintain the peer-to-peer connection, the vendor access interface application 346 and the access control device 302 may be configured to send periodic packets back and forth without substantive data payloads. If there is no data traffic on the peer-to-peer connection for a predetermined period, a "timeout" setting within the NAT applications of each of the network access devices 304, 344, the NAT applications will delete the assigned external port numbers for the access control device 302 and the vendor client device 342 in the respective look-up tables. New packets would be assigned different external port numbers and the packets would not be deliverable to the respective peer devices behind the network access devices 304, 344 and the direct connection would be lost. A new connection with a new session ID code brokered by the STUN server 338, 470 would have to be established. Maintaining the tunnel connection 362 by sending periodic empty packets is often referred to as "punching a hole" through the network access devices 304, 344.

The process next queries on both the remote client network 340, 464 and the premises network 352, 462 whether a P2P connection was established between the vendor client device 342 and the access control device 302 as indicated in operations 428 and 430. If the determination is affirmative, the process on the side of the client network 464 maintains a persistent connected status as indicated in operation 438 unless and until a notice of session termination is received as indicated in operation 422. During the persistent connected state, the access interface application 346 on the vendor client device 342 on the remote client network 340, 464 may regularly communicate with the cloud server 468 to transmit information about the session for documentation and storage as indicated in operation 440. Such information may include the public IP address of the vendor client network 340, 464, the public port for the session, the MAC address of the vendor client device 342, operating system (OS) information, processor information, virtual private network (VPN) connection information, physical location information, and ISP information. Such information may be useful for forensic purposes in the unlikely event of a security breach of the premises network 352, 462. Upon receipt of a session termination notice, the process on the vendor client network 340, 464 ceases as indicated in operation 444. Similarly, on the premises network 352, 462, if the determination whether a P2P connection was created is affirmative, the process on the premises network side 352, 462 maintains a persistent connected status as indicated in operation 446 unless and until a notice of session termination is received as indicated in operation 448. Upon receipt of a session termination notice, the process on the premises network 352, 462 ceases as indicated in operation 450.

Alternatively, if the determination in operation 428 on the remote client network 340, 462 is that the P2P connection between the vendor client device 342 and the access control device 302 was not established, then an alternate connection may be attempted through TURN server 436 (identified as TURN server 348 in FIG. 3) via paths 366b over the internet 364 as indicated in operation 432. Peer-to-peer connections can fail depending upon the configuration of the NAT application as the gateway to a particular network and some configurations can prevent establishment of a peer-to-peer connection. A similar query, determination, and fallback to using the TURN server 348, 472 is made in operation 434 of the process on the premises network side 352, 462. The TURN server 348, 470 also requires that each of the vendor client device 342 and the access control device 302 contact it with identical session ID codes to pass traffic between them as indicated in operation 436. The TURN server 472 thus acts as the necessary intermediary public server to pass data between two peer devices on different local area networks. Use of a TURN server 348, 472 that is part of and under the control of the system 300 provides an additional layer of security if a tunnel connection 362 cannot be established.

After a connection to the TURN server 348, 472 is established, the process on the client network 340, 464 maintains a persistent connected status as indicated in operation 438 unless and until a notice of session termination is received as indicated in operation 422. As during a peer-to-peer connection, the vendor client device 342 may provide session identification information to the cloud server 336, 468 during the connected state as indicated in operation 440. Upon receipt of a session termination notice, the process on the vendor client network 464 ceases as indicated in operation 444. Similarly, on the premises network 462, after the TURN server connection is established, the process on the side of the premises network 462 maintains a persistent connected status as indicated in operation 446 unless and until a notice of session termination is received as indicated in operation 448. Upon receipt of a session termination notice, the process on the premises network 462 ceases as indicated in operation 450.

FIG. 3 further depicts a tunnel extension 368 extending from the access control device 302 within the premises network 352. The tunnel extension 368 represents generally direct communication between the vendor client device 342 and a malfunctioning device 328 (e.g., a security camera) logically isolated on a virtual LAN (VLAN) 354 and accessed through a container environment 350. As discussed in greater detail further herein, the access control device 302 is configured to create a plurality of container environments 350 that isolate network devices within virtual LANs 354. A container environment is "lightweight" virtual operating system and provides an isolated environment configured to package and run applications. The isolation and security allows for many containers to run simultaneously on a given host. Containers contain the necessary system software components to run desired applications within the environment, so there is no reliance on applications installed on the host.

In the example of FIG. 3, the malfunctioning device 328 (e.g., a security camera) is configured to be a part of the indicated VLAN 354. Referring to FIG. 1, the access control device 102/302 is physically connected to all the subnetwork switches 110, 114, 118, 122, 126, 130 on the premises network 152, 352. In an implementation as depicted, all of the security cameras 128 may be on the same subnetwork 126. The access control device 302 acts as a container daemon and the containers 350 instantiated by the access control device 302 are clients to the daemon. In implementations, for example, as shown in and described with respect to FIG. 7, the access control device 302 may place each subnetwork of a particular type of premises device (e.g., security cameras 128) in a separate container and configure the devices in a container to be on a separate VLAN 354. As shown in FIG. 3, the VLAN 354 associated with the container environment 350 is assigned a separate subnetwork IP address, e.g., 172.16.8.1 (see address indicator 392), where the final number, 0.1, is assigned to the access control device 302, which is present as a device within each VLAN 354 created and associated with a respective container environment 350. The operating system of the container environment 350 also assigns a port number, e.g., 9999, to the access control device 302 for communications with devices in the VLAN 354. Each device connected within the VLAN 354, e.g., malfunctioning device 328, is also assigned an IP address on the VLAN 354 that is only accessible through the container environment 350. In this example, the malfunctioning device is assigned IP address 172.16.8.12 (see address indicator 394) by the access control device 302, where the final number, 0.12, identifies the specific camera device 328 on the VLAN 354 and a service port number (e.g., 2345) is provided for communication with a particular service (e.g., firmware control) of the malfunctioning device 328.

An implementation of packet architecture used in the disclosed system 300 is depicted in the schematic diagram of a UDP packet 500 presented in FIG. 5. The packet 500 is depicted with the standard header portion 502 and payload portion 504. The first field 506 of the header portion 502 is the local network or Ethernet address of either the access control device 302 or the vendor client device 342 on their respective networks (e.g., 10.1.1.2:5555 for the access control device 302 and 192.168.1.2:7777 for the access interface application 346 on the vendor client device 342). This field is stripped from the packet 500 by the network access devices 304, 344 and replaced with the second field 508 of the header portion 502 comprising the standard public source and destination IP addresses for the premises network 352 (e.g., 50.50.50.50) and the vendor network 340 (e.g., 60.60.60.60). The third field 510 in the header portion 502 is the UDP header with the external source port and destination port numbers assigned by the network access devices 304, 344 (e.g., 2222 and 3333, respectively) to reference the Ethernet LAN addresses: ports of the access control device 302 and the access interface application 346 on the vendor client device 342, which are stored in respective look-up tables. The local IP address: port information in the first field 506 is used to inform the network access devices 304, 344 of the internal network source of the packets so external packets received with the public IP addresses of the second field 508 and external port assignments of the third field 510 will be routed appropriately to either the access control device 302 or the vendor client device 342 using the respective network NAT application look-up table. Upon receipt of an external packet, of a received packet by the network access devices 304, 344 strip, the second field 508 and the third field 510 are stripped from the header and replaced with the first field 506 information from the look-up tables containing the Ethernet LAN IP address of either the access control device 302 or the vendor client device 342 depending on the receiving network (premises or vendor).

The payload portion 504 of the UDP packet 500 also contains several fields. The payload portion 504 typically only contains the application data being transferred across the network between devices. However, in this implementation, the payload portion 504 may be divided into fields recognizable by the access control device 302 and the access interface application 346 on the vendor client device 342.

A fourth field 512 of the packet 500 in the payload portion 504 may contain a session header with vendor identification information and a session authentication code, e.g., assigned upon instantiation of a session of the container to which the malfunctioning device was logically assigned by the access control device 302. The session header in the fourth field 512 may be used by the access interface application 346 and the access control device 302 to verify the authorization of the transmission and the current validity of a session. For example, if a session had previously timed out or the vendor had completed the work and terminated the session, and a packet with the expired session ID code subsequently arrives, the late-arriving packet would be dropped and an alert may be raised to the possibility of an attempted breach of the premises network. This packet architecture provides yet another layer of security for the premises network 352 when allowing access to outside vendors.

A fifth field 514 may include an Ethernet IP header in the form of a Virtual Network Interface (VNI) address (denoted as 10.10.10.10 in the example implementation in the figures), which may be generated as a substitute address used to mask the actual local IP addresses of devices on the premises network 352. A VNI is an local network IP address that does not correspond to a physical network interface. Incoming data packets destined to a VNI address are routed to different actual local network IP addresses using address translation. Alternatively, an exclusively-owned, public IP address providing exclusive and restricted use access by the owner could be used as the substituted address in the Ethernet IP header of the fifth field 514 for masking purposes.

In an alternative example implementation, the standard loopback address (127.0.0.1) may be used for the Ethernet IP header rather than a VNI. Typically, the loopback interface routes data communications with the loopback IP address back to their source without intentional processing or modification, i.e., the communication merely loops internally. Its primary use is for testing the communications infrastructure of the computer device. In this implementation, the loopback address and function may be uniquely used to mask the actual local IP addresses of devices on the premises network 352 as further described below. For purposes of this document, the term "masking IP address" is intended to refer to the use of the loopback address, a VNI address, or an exclusively-owned, public address for purposes of substitution in an IP header to hide the true network address of a premises device as further described herein.

The access control device 302 and the access interface application 346 may both be configured to analyze or "sniff" packet payloads for a field with the masking IP address. Use of the masking IP address provides a consistent IP address and indicates that the packet 500 is associated with the UDP tunnel transmission between the access control device 302 and the vendor client device 342. The masking IP address is differentiable from standard local network address formats (e.g., 127.0.0.1 vs. 192.168.1.x or 10.2.1.x) and is static, particularly because assignment of local IP addresses by the network access devices 304, 344 is dynamic (i.e., the "x" value changes between devices and often changes when a client device logs off and then back on to the local network). A random port number assignment identifies the packet as a communication related to the malfunctioning device 328 to both the access control device 302 and the access interface application 346 for appropriate handling within either the respective container 350 or the access interface application 346.

The port numbers following the masking IP addresses may be randomly assigned as follows. The access control device 302 may act like a device operating system and randomly generate a port number and assign it to the malfunctioning device 328 for duration of the peer-to-peer tunnel session. Unlike port number generation by a device operating system, which may use standard port numbers for specific services related to the particular type of device, the access control system generates a random port number (e.g., represented as ASSN #; see also address indicator 386 in FIG. 3). Once the session ends, the randomly assigned port number is discarded and is no longer associated with the malfunctioning device 328. If the malfunctioning device 328 needs to be accessed in a future session, a new random port number may be generated and assigned by the access control device 302. The randomly assigned port number is used as the port number in the masking IP address (i.e., 10.10.10.10.ASSN #) for communication through the tunnel. The completed masking IP address for the malfunctioning device 328 is logged as corresponding to the container VLAN IP address: port number (see address indicator 394) of the malfunctioning device 328 in a look-up table managed by the access control device 302. On the vendor client device 342, the access interface application 346 requests a port number from the operating system as normal for use with the masking IP address for communication through the tunnel. The port number may be used for the entirety of the peer-to-peer tunnel connection. In the examples of FIGS. 3, 5, and 7, the port number allocated by the operating system of the vendor client device is 54321 (see address identifier 390).

Upon receipt of a packet at the premises network access device 304, the IP header field 508 and UDP header field 510 are stripped from the packet 500 by the premises network access device 304 and replaced with the local LAN IP address and port number for the access control device 302 corresponding to the incoming port number (e.g., 2222; see also address indicator 380) in the UDP header field 510 as stored in the look-up table of the premises network access device 304. The packet 500 is then forwarded to the access control device 302 with the payload portion 504 intact. Similarly, upon receipt of a packet at the vendor network access device 344, the IP header field 508 and UDP header field 510 are stripped from the packet 500 by the vendor network access device 344 and replaced with the local LAN IP address and port number for the access interface application 346 on the vendor client device 342 corresponding to the incoming port number (e.g., 3333; see also address identifier 382) in the UDP header field 510 as stored in the look-up table of the vendor network access device 344. The packet 500 is then forwarded to the vendor client device 342 with the payload portion 504 intact. (Note, as is typical on local networks, a router or intermediate switch may further map the local IP addresses to media access control (MAC) addresses using Address Resolution Protocol (ARP) tables for transmittal of the packets to the access control device 302 or the vendor client device 342 on the respective LANs 352, 340 using Layer 2 protocol.)

The access interface application 346 on the vendor client device 342 is configured to assemble outgoing packets and read incoming packets in the form of packet 500. Use of the masking IP address in the packet payload provides an additional layer of security by hiding the true location of devices connected through the access control device 302 on the premises network 352 from the vendor client device 342. The access interface application 346 is configured to reinsert the masking IP address into the fifth field 514 into the payload of packets 500 sent to the premises network 352, which can be converted by the access control device 302 to network addresses behind the access control device 302 through the temporary look-up table maintained by it.

If a packet was snooped and an attempt was made to directly connect to the premises network 352 outside of the access interface application 346, the only IP address in a packet, other than for the network access device 304, is the masking IP address in the payload 504, which would not be recognized by the premises network access device 304. Further, the port number assigned to the malfunctioning device 328 by the access control device 302 and added to the masking IP address in the packet 500 (see address indicator 386) is also meaningless on both the vendor network 340 and the premises network 352 as the port number was randomly generated by the access control device 302. Even if a malicious user attempted to combine the public IP address of the premises network 352 with the assigned port number (see address indicator 386), the premises network access device 304 would find no such port and return an error on the communication attempt. In the case of an using an exclusively-owned, public IP address as the masking address, an attempt to access a network device using such an IP address would reach a dead location controlled by the IP address owner.

In the special case of using of the loopback IP address as the masking IP address in the packet payload, if a saboteur were to use the loopback IP address in an attempt to reach devices behind the network access device 304, per UDP protocol, when the payload is received and processed, the vendor client device 342 would recognize the loopback IP address in both the source and destination fields (packet field 514) as originating within the vendor client device 342 itself rather than from another device on an entirely separate network. Thus, the vendor client device 342 is "tricked" as to the location of the malfunctioning device 328 and believes that it is communicating with the malfunctioning device 328 at a port on the vendor client device 342. Similarly, any malicious access attempt using the loopback IP address in an attempt to directly reach a device behind the access control device 302 would be internally returned within the originating remote client device and generate an error because the port would not be found on such remote client device.

A sixth field 518 in the packet 500 is the data payload, which contains the actual substantive data communications between the vendor client device 342 and the malfunctioning device 328. Such data may include diagnostic data from the malfunctioning device 328, instructions to the malfunctioning device 328, an instantiation of a graphical user interface toolkit for troubleshooting and repairing the malfunctioning device 328, firmware and other code updates for the malfunctioning device 328, and other similar data.

Once the peer-to-peer connection between the access control device 302 and the vendor client device 342 is established, communications between the vendor client device 342 and a malfunctioning device 328 may be implemented under the control of the access control device 302. An exemplary implementation of a control process is presented in FIG. 6. Recall that the peer-to-peer connection is created between the access control device 302 and the vendor client device 342 and not directly between the vendor client device 342 and the malfunctioning device 328 on the premises network 352. As shown in FIGS. 1 and 3 and previously described herein, the subnetworks 112, 116, 120, 124, 128, 132 are both physically connected to the access control device 102/302, but also logically constrained within respective containers 350 on respective VLANs 354 instantiated and architected by the access control device 302. Thus, the access control device 302 can control external communication traffic from external networks to any device on the premises network 352 connected to the access control device 302, regardless of whether the device is also connected to the core switch 108 (see FIG. 1). Any traffic passing through the core switch 108 addressed to a device on a VLAN 354 administered by the access control device 302 would be regulated by the access control device 302.

External communication between the vendor network 140/340 and the premises network 352 will use the external IP addresses (e.g., 60.50.50.50 and 60.60.60.60 as shown, for example, in FIG. 3) with port numbers assigned to the access control device 302 and the vendor client device 342 by their respective network access devices 304, 344. The communication traffic will thus never be sent directly to the malfunctioning device 328 on the premises network 352 by the network access device 304 and the vendor client device 342 will never be provided with a port number specifically assigned to the malfunctioning premises device 328. The process of FIG. 6 in conjunction with the packet format of FIG. 5 produces this result and provides even further security for the premises network 352, which will be apparent from the following discussion.

Process steps in FIG. 6 are divided between those process steps 602 performed on the premises network and those process steps 604 performed on the vendor network. First, the access control device 302 identifies a problem with a device on the premises network as indicated in operation 606. As described above, problems can be identified through "heartbeat" checks and further automated diagnostics by the access control device 302. If a device malfunction is determined, the access control device 302 may next access the previously created container environment to which the malfunctioning device was assigned as indicated in operation 608. The access control device 302 next undertakes the necessary steps to establish a peer-to-peer connection with the vendor client device 342 of the vendor with maintenance and repair responsibility for the container with the malfunctioning device as indicated in operation 610. This process was discussed in detail above with respect to FIG. 4. In brief, the access control device 302 contacts the web server 336 overseeing the access platform to identify the vendor associated with the container and to initiate an alert message to the vendor requesting connection to the access control device 302 by the vendor client device 342 to troubleshoot and repair the malfunctioning device 328 on the premises network 352. As described with respect to FIG. 4, establishment of a peer-to-peer connection between the access control device 302 and the vendor client device 342 using a STUN server 338 is the preferred connection method.

In the special case that a loopback IP address is used, once the P2P connection is established, the access interface application 346 on the vendor client device 342 may be configured to determine whether a loopback interface is active on the vendor client device 342 as indicated in operation 612. The standard loopback IP address (127.0.0.1) is typically preprogrammed and active on most personal computer devices. However, if a loopback address is not active, the access interface application 346 is configured to activate it on the vendor client device 342.

Returning to the process 602 on the access control device in FIG. 6, the access control device 302 assigns a random port number to the malfunctioning device 328 as indicated in operation 614. This random assigned port number does not replace the port number of the device on the VLAN 354 assigned by the access control device 302. However, this random port number is used as a substitute port number in the masking IP address to mask the true port number in all communications with the vendor client device 342 as further described herein. The malfunctioning device communicates only with and through the access control device 302 and communications between the two are on the VLAN 354. Thus the VLAN IP address: port combinations (or translated MAC addresses for each device) are used for communications between the malfunctioning device 328 and the access control device 302 through the respective subnetwork switch (e.g., switch 126) on the VLAN 354.

The access control device 302 prepares the packets for transmission to the vendor client device 342 according to the packet architecture described with respect to FIG. 5 using the masking IP address in combination with the locum port number assigned to the malfunctioning device as indicated in operation 616. In operation 618, the access control device 302 sends a packet 500 in the format of FIG. 5 with the masking IP address and randomly assigned port number in the fifth field 514 through the network access device 304 to the vendor client device 342 to initiate a troubleshooting/repair communication session. Recall, for communications external to the premises network 352, the network access device 304 strips the LAN Ethernet header from outbound traffic and replaces it with the public IP address of the premises network 352 and typically also assigns an external port number that is translated to the local IP address: port number of the network device 328 involved in the communication. In the present implementation, the malfunctioning device 328 is behind the access control device 302 and all traffic with the vendor client device 342 is through the tunnel 362. Thus, the network access device 304 assigns the external port number associated with the access control device 302 when the tunnel 362 was established as the source address and the external IP address of the vendor network 340 with the port assigned to the access interface application 346 on the vendor client device 342 as the destination address in the IP header field 508 and UDP header field 510, respectively.

Upon receipt of the packet 500, the vendor access interface application 346 interrogates the payload data in the packet 500 looking for the masking IP address in packet field 514 as indicated in operation 620. As described above, if the fifth field 514 includes the masking IP address, the access interface application 346 recognizes the packet as a repair communication related to the malfunctioning device 328 assigned the random port number and uses or presents the data to a vendor technician through an interface instantiated in the access interface application 346 on the vendor client device 342 for troubleshooting and repairing the malfunctioning device 328. As indicated in operation 622, the access interface application 346 similarly prepares a packet 500 to send back to the access control device 302 and ultimately the malfunctioning device 328 for testing and repair. The packet 500 may be in the same form as shown in FIG. 5 including the masking IP address and random assigned port number in the fifth field 514. The vendor network access device 344 then sends the packet through the tunnel 362 after inserting the public IP address of the premises network 352 and port number assigned to the access control device 302 in the packet header 502 to the access control device 302 on the premises network as indicated in operation 624.

The process returns to process steps 602 on the access control device 302 on the premises network where the packet sent by the vendor network access device 344 is received by the premises network access device 304 and forwarded to the access control device 302 as indicated in operation 626. As described above, the access control device 302 similarly sniffs the payload of packets, looking for the masking IP address to identify communications from the vendor client device 342 as opposed to the premises local area network 352 or a VLAN network 354 associated with a container 350. The random assigned port number following the masking IP address in the fifth field 514 is used to identify the malfunctioning device 328 and its port number on the VLAN 354. A new Ethernet header with the local VLAN IP address and port number of the relevant service on the malfunctioning device is added to the packet as indicated in operation 630. The packet communication with the local header can then be routed through the appropriate subnetwork switch to reach the malfunctioning device 328 as indicated in operation 630. In addition, the source IP address in the packet is the IP address of the access control device 302 within the respective VLAN 354 with a port number assigned by the access control device 302 to indicate the appropriate vendor client device 342 so that any return communication packets from the malfunctioning device 328 will be routed to the access control device 302 and ultimately to the correct vendor client device 342.

Communications from the malfunctioning device 328 with the local destination port of the access control device 302 corresponding to the relevant vendor client device 342 are thus received at the access control device 302 for forwarding to the vendor client device 342 as indicated in operation 632. The access control device 302 modifies the packet headers and payload data to provide the masking IP address and insert the assigned port number for the malfunctioning device 328. The packet 500 is passed to the network access device 304 which inserts the public IP address, assigns the public port number associated with the access control device 302, and transmits the packet 500 to the vendor client device 342 as indicated in operation 634. The process 600 then returns to operation 620 on the vendor network and loops through operations 620-634 until the session is terminated by the vendor or times out due to a set expiration period of a session as indicated in operation 636.

FIG. 7 is a schematic diagram of one exemplary implementation of system 700 in which the access control device 702 implements multiple container environments. The access control device 702 may instantiate one or more containers 750a, 750b, 750c, 750d, 750e, 750n, e.g., within a Docker engine, for providing access to any number of virtual LANs 754a, 754b, 754c, 754d, 754e, 754n that include respective subsets of the connected devices for specific vendors. As noted above, a container is a virtual environment instantiated by the processor of the access control device 702 with standardized executable components combining application source code and the operating system libraries and dependencies required to run that code. Any container 750a, 750b, 750c, 750d, 750e, 750n may include any subset of the devices on the entire premises network as allocated by a premises operator for access by a particular vendor as part of a dedicated virtual LAN associated with the container. The containers 750a, 750b, 750c, 750d, 750e, 750n may be independent of each other and may not communicate with each other.

For the sake of simplicity and with reference to the depiction in FIG. 1, in the exemplary embodiment shown, a container is created for each of the subnetworks 712, 716, 720, 724, 728, and 732 considering that different repair vendors would provide service to different systems (e.g., telephones, WiFi, card key lock systems, IP television, security cameras, HVAC, etc.). The subnetworks 712, 716, 720, 724, 728, and 732 are connected by their corresponding subnetwork switches 710, 714, 718, 722, 726, and 730 within the larger premises network. Typically, all devices on the same subnetwork 712, 716, 720, 724, 728, and 732 (i.e., behind a particular switch, e.g., all security cameras) would be assigned to a single virtual network in a container for a vendor. However, such is not required and any combination of devices on the premises network can by assigned to a VLAN within a container.

In this exemplary depiction, the access control device 702 appears as a separate connected device on each of the virtual LANs 754a, 754b, 754c, 754d, 754e, 754n. For example, in Container C 750c the access control device 702 would be assigned a VLAN IP address with an unused device number, i.e., 172.16.6.1 (e.g., a reserved device number 1), to appear as another device on the VLAN 754c in Container C 750c. Each of the keyless entry door locks on subnetwork 720 may be assigned a separate IP address on the virtual LAN 754c, i.e., 172.16.6.1+n, where "n" is the device number in the VLAN IP address assigned to a particular door lock. For example, if there are 30 door locks, each door lock on the subnetwork 720 may be assigned a number among 2-31 as part of its VLAN IP address. The access control device 702 would also appear as a separate device on the VLAN 754d of Container D 750d with a different IP address specific to that VLAN 754d, e.g., 172.16.7.1 as indicated, and so on for each container created within the access control device 702.

The access control device 702 may be connected with a vendor client device 742 (e.g., a personal computer) at a remote vendor location 740 through a secure UDP tunnel 762 over the Internet 764 as previously described with respect to FIGS. 3 and 4. The access control device 702 preferably connects behind the network access device 704 with NAT functionality (or further behind a separate NAT router) on the LAN providing the public IP address and port forwarding service to devices on the premises network, including the access control device 702. The secure UDP tunnel 762 provides a network link between the access control device 702 and the vendor client device 742 behind the network access device 744 at the vendor location 740. The secure UDP tunnel connection 762 allows the vendor to remotely access or control the connected devices on the respective VLAN 754a, 754b, 754c, 754d, 754e, 754n within the one of the containers 750a, 750b, 750c, 750d, 750e, 750n assigned to the vendor through the device management system 700. As noted, the containers 750a, 750b, 750c, 750d, 750e, 750n are independent of each other and bundle their own diagnostic and repair tools, software, libraries, and configuration files and, in this implementation, are configured not communicate with each other. Thus, third party vendors are only allowed access to the VLAN within their assigned container 750a, 750b, 750c, 750d, 750e, 750n and are unable to connect with other devices on the entire premises network 752. By controlling and limiting network access to third parties (e.g., service vendors) to only devices on the VLAN within assigned containers, network security is enhanced.

The premises operator may initially configure containers 750a, 750b, 750c, 750d, 750e, 750n within the access control device 702 or a vendor can configure an assigned container 750a, 750b, 750c, 750d, 750e, 750n with the permission of the premises operator. The access control device 702 may be configured to discover every connected device (e.g., IP devices, serial devices, wirelessly networked devices (e.g., 802.11 WiFI, LoRaWAN, Bluetooth), and BACnet devices) on each subnetwork and provide an interface for assignment of each device to one (or more) of the containers and corresponding VLANs (e.g., depending on the type of connected device selected (phone, camera, AC unit, etc.)). The connected devices to be monitored are added to their respective container 750a, 750b, 750c, 750d, 750e, 750n. As new connected devices are assigned to a vendor, the access control device 702 may automatically route to the default local IP address to the respective vendor container to configure the same.

Threshold parameters may be set in the containers 750a, 750b, 750c, 750d, 750e, 750n by vendors or premises operators for initiating alarms upon detecting failures such as connection loss, data loss, network loop, IP address change, DOS attacks, temperature fluctuation, current-voltage fluctuation, erratic behavior, etc. Additionally, parameters for alert mechanisms, email notification, SMS, and ticketing systems may be set in the containers 750a, 750b, 750c, 750d, 750e, 750n. Further, device serial numbers, warranty information, and model numbers may be entered into local data stores in the containers 750a, 750b, 750c, 750d, 750e, 750n. For each of the containers 750a, 750b, 750c, 750d, 750e, 750n, the network topology may be determined, i.e., parent and child objects may be determined and grouped accordingly and stored in a data store within the container. Vendor information for each connected device within the container 750a, 750b, 750c, 750d, 750e, 750n may be identified and available to the container 750a, 750b, 750c, 750d, 750e, 750n, including any manufacturer permissions or authentication requirements for access by a vendor. A basic network tool set such as ping/ARP, tracert, NsLookUp, speed test, node test, HTTP access, https access, tenet, SSH, device discovery, duplicate IP protection, NetStat/Tracert, port checker, MAC to the vendor, IfConfig/IpConfig, may be provided to the containers 750a, 750b, 750c, 750d, 750e, 750n by default.

The disclosed system 700 can provide secure and limited remote access through the access control device 702 to a specific port of a specific device on the premises LAN 752 without using the normal network address translation (NAT) with port forwarding procedures employed by the network access device 704. Use of NAT by the network access device 704 can be a security risk for devices on the LAN because sophisticated remote users may ultimately access the entire LAN. Remote access through the access control device 702 may be further limited by authentication processes. As described above, the access control device 702 may also generate random port assignments for devices for vendor device port connections, implement data encryption, and provide a timer mechanism for vendor dwell time in the containers 750a, 750b, 750c, 750d, 750e, 750n to minimize the possibility of unauthorized access to other devices or data on the premises network. Random port number assignment of network devices in conjunction with the use of virtual IP addresses in the packet payloads provides additional security to the premises network 752 by hiding local IP addresses and port numbers from third parties accessing the premises network 752 for servicing network devices.

In some instances, multiple devices under a repair contract with a single vendor may simultaneously malfunction. Allowing a vendor to have concurrent access to multiple devices allocated to a subnetwork may help expedite the repair process, particularly if the problems are common across many of the devices. However, the greater the access allocated to the premises network 752, the greater the opportunity for a malicious actor to take down the entire subnetwork as opposed to only a limited number of devices on the subnetwork. The creation of container environments 750a, 750b, 750c, 750d, 750e, 750n and corresponding VLANs 754a, 754b, 754c, 754d, 754e, 754n allows the access control device 702 to exercise dynamic, limited, and secure access to network devices on the subnetworks 712, 716, 720, 724, 728, 732 connected to the premises network 752 by remote vendor client devices 742. While a large number of client devices may be allocated to the same VLAN (e.g., all of the security cameras 728 on a premises network 752 may be in the same VLAN 754e), the access control device 702 may provide dynamic control over configurations the container environments 750a, 750b, 750c, 750d, 750e, 750n to a premises operator over which network devices are accessible in a container at a particular time.

For example, upon receipt of a notice of a malfunctioning device, the premises operator may decide to configure a container to expose only the malfunctioning device, or a few devices at a time, to the remote vendor client device 742 and prevent access to all other devices on the VLAN. Since the access control device 702 randomly assigns port numbers to network devices in outgoing UDP communications and pairs the port numbers with the masking IP address, there is no ability for a client device outside the premises network 752 to identify and contact any other devices on the premises network 752. Additionally, the premises operator may provision a container environment 750a, 750b, 750c, 750d, 750e, 750n to "time out" and terminate an access session after a predetermined period, thereby limiting the ability of an external actor to maintain unfettered access to the premises network 752.

An exemplary computer system 800 embodying the access control device implementing the processes performed thereby as described above is depicted in FIG. 8. The computer system 800 embodying the access control device may be special purpose computer device, or it may be one or more of a personal computer (PC), a workstation, a notebook or portable computer, a tablet computer, a smart phone device, a video gaming device, or other computer device, with internal processing and memory components as well as interface components for connection with external input, output, storage, network, and other types of peripheral devices, particularly configured to perform the functions described herein. Internal components of the computer system 800 in FIG. 8 embodying the access control device 864 are shown within the dashed line and external components are shown outside of the dashed line. Components that may be internal or external are shown straddling the dashed line. The access control device 864 is shown encompassed by the dashed line to both indicate that the internal components are within it, and also to indicate the relationship between the access control device and the networks to which it is connected.

In any embodiment of the access control device described herein, the computer system 800 includes a processor 802 and a system memory 806 connected by a system bus 804 that also operatively couples various system components. There may be one or more processors 802, e.g., a single central processing unit (CPU), or a plurality of processing units, commonly referred to as a parallel processing environment (for example, a dual-core, quad-core, or other multi-core processing device). The system bus 804 may be any of several types of bus structures including a memory bus or memory controller, a peripheral bus, a switched-fabric, point-to-point connection, and a local bus using any of a variety of bus architectures. The system memory 806 includes read only memory (ROM) 808 and random access memory (RAM) 810. A basic input/output system (BIOS) 812, containing the basic routines that help to transfer information between elements within the computer system 800, such as during start-up, is stored in ROM 808. A cache 814 may be set aside in RAM 810 to provide a high-speed memory store for frequently accessed data.

A storage drive interface 816 may be connected with the system bus 804 to provide read and write access to a data storage drive 818, e.g., a magnetic hard disk drive or a solid state drive for nonvolatile storage of applications, files, and data. A number of program modules and other data may be stored on the storage drive 818, including an operating system 820, one or more application programs 822, and related data files 824. In particular, an access management program 826 implementing the access and transmission protocols described herein may be stored in the storage drive 818. In addition, separate container files 828, 830 may be stored with related data for instantiation of each container in RAM 810 when a particular system linked to the LAN needs to be accessed for trouble shooting and repair of a device. Note that the storage drive 818 may be either an internal component or an external component of the computer system 800 as indicated by the storage drive 818 straddling the dashed line in FIG. 8.

In some configurations, there may be both an internal and an external storage drive. For example, one or more external storage drives 834 may be connected with the system bus 804 via an external storage interface 832 to provide read and write access to the external storage drive 834 initiated by other components or applications within the computer system 800. (In some embodiments, external storage drives may also be connected to the system bus 804 via a serial port interface 840 further described below. Exemplary external storage drives 834 may include a magnetic disk drive for reading from or writing to a removable magnetic disk 832, tape, or other magnetic media, and/or an optical disk drive for reading from or writing to a removable optical disk 838 such as a CD-ROM, a DVD, or other optical media. The external storage drive 834 and any associated removable computer-readable media may be used to provide nonvolatile storage of computer-readable instructions, data structures, program modules, and other data for the computer system 800.

The computer system 800 may include a display device 838, e.g., a monitor, a television, or a projector, or other type of presentation device connected to the system bus 804 via an interface, such as a video adapter 836 or a video card. The computer system 800 may also include other peripheral input and output devices, which are often connected to the processor 802 and memory 806 through the serial port interface 840 that is coupled to the system bus 804. Input and output devices may also or alternately be connected to the system bus 804 by other interfaces, for example, a universal serial bus (USB), an IEEE 1394 interface ("Firewire"), a parallel port, or a game port. A user may enter commands and information into the computer system 800 through various input devices including, for example, a keyboard 842 and pointing device 844, for example, a computer mouse. Other input devices (not shown) may include, for example, a microphone 846, a digital video camera 848, a digital camera, a joystick, a game pad, a tablet, a touch screen device, a satellite dish, a scanner, or a facsimile machine.

Output devices may include one or more loudspeakers 850 for presenting the audio performance of the sender. Audio devices, for example, external speakers 850 or a microphone 846, may alternatively be connected to the system bus 804 through an audio card or other audio interface (not shown). Other output devices may include, for example, a printer 852, a plotter, a photocopier, a photo printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic disks or flash memory drives, may be accessed by the computer system 800 via the serial port interface 844 (e.g., USB) or similar port interface.

As previously described herein, the computer system 800 embodying the access control device 864 may include a battery 866 for provision of backup power in a case of general or local power outage or emergency. The access control device 864 may further include a wireless telephone transceiver 868 for provision of external communication for premises operator communication or remote vendor access in a case of local network outage or emergency. The access control device 864 may additionally include a GPS chip 870 to provide location information about the device, e.g., for security purposes as described herein. Location information identified by the GPS chip 870 may be used to enact security features for the access control device 864 as previously described herein.

The computer system 800 may operate in a networked environment using logical connections through a network interface 854 coupled with the system bus 804 to communicate with one or more remote devices. The logical connections depicted in FIG. 8 include a local-area network (LAN) 858 and a wide-area network (WAN) 860. Such networking environments are commonplace in home networks, office networks, enterprise-wide computer networks, and intranets. These logical connections may be achieved by a network access device 856 coupled to or integral with the computer system 800. As depicted in FIG. 8, the network access device 856 is operating as both a router for directing traffic on the LAN 858 may use a router 856 or hub, either wired or wireless, internal or external, to connect with remote devices, e.g., a remote computer 858, similarly connected on the LAN 858. The remote computer 858 may be another personal computer, a server, a client, a peer device, or other common network node, and typically includes many or all of the elements described above relative to the computer system 800.

To connect with a WAN 860, the computer system 800 the network access device typically includes a modem for establishing communications over the WAN 860. However, in some embodiments, the modem for external network connections and the router for local network connections may be separate components. Most often the WAN 860 may be the Internet. However, in some instances the WAN 860 may be a large private network spread among multiple locations, or a virtual private network (VPN). The modem component of the network access device may be a telephone modem, a high-speed modem (e.g., a digital subscriber line (DSL) modem), a cable modem, or similar type of communications device. The network access device 856 with modem is connected to the system bus 804 via the network interface 854. In alternate embodiments the network access device 856 may be connected via the serial port interface 844. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoded with a computer program. It should further be understood that the described technology may be employed in special purpose devices independent of a personal computer.

In an implementation, method is provided for direct, secure access to a subset of a plurality of devices connected on a local area network to a remote computer device external to the local area network. External access to the local area network is controlled by a network access device. An access control device is connected to the local area network and separately to the subset of the plurality of devices. The method executed by the access control device including transmitting through the network access device a request to the remote computer device to connect to the access control device via an intermediate STUN server using a peer-to-peer connection. A peer-to-peer connection is established between the access control device and the remote computer device. A random service port number is generated to associate with one device of the subset of the plurality of devices. A data packet is created to send to the remote computer device and includes the random service port number in a payload portion of a data packet. The data packet is transmitted over the peer-to-peer connection to the remote computer device including instructions to the remote computer device to include the random service port number in payload portions of any return packets transmitted by the remote computer to the access control device. Return packets are received from the remote computer device over the peer-to-peer connection with the random service port number associated with the one device in the payload portions of the return packets. The payload portions of the return packets received from the remote device are transmitted to the one device to establish a communication tunnel between the remote computer device and the one device without providing the remote computer device direct access to the local area network.

In another example implementation, the described method further includes placing a masking IP address in the payload portion in conjunction with the random service port number before forwarding the payload to the remote computer device.

In another example implementation, any of the methods above further include reviewing packets received over the peer-to-peer connection to identify the masking IP address in the payload portion; and forwarding data in the payload portions of packets including the masking IP address to the one device associated with the random service port number accompanying the masking IP address.

In another example implementation, any of the methods above further include instantiating a container environment; creating a virtual local area network including the access control device and the subset of the plurality of devices; and configuring the container environment to exercise access control over the virtual local area network including management of exposure of the subset of the plurality of devices to the remote computer device.

In another example implementation, any of the methods above further include providing access to the container environment and the virtual local area network to an interface device connected directly to the access control device; and providing one or more applications within the container environment configured to allow a user of the interface device to control access to individual devices in the subset of the plurality of devices by the remote computer device.

In another example implementation, any of the methods above further include monitoring each device in the subset of the plurality of devices within the container environment to determine a status of each device; and generating status information based upon the status of each device; and transmitting the status information to the interface device.

In another example implementation, any of the methods above further include storing the random service port number for the one device in a look-up table corresponding to an IP address and port for the one device on the virtual local area network; and wherein the transmitting of the payload portions of the return packets includes identifying random service port number in the payload portion of the return packets; and determining the IP address and port on the virtual local area network for the one device from the look-up table in order to transmit the payload portion of the return packets to the one device.

In another example implementation, in of any of the methods, wherein the subset of the plurality of devices is connected to a switch dedicated to subset of the plurality of devices and the access control device is also connected to the switch.

In another example implementation, any of the methods above further include assigning one or more of the devices of the subset of the plurality of devices to a virtual local area network which includes the access control device.

In another example implementation, any of the methods above further include assigning multiple devices of the plurality of devices to multiple subsets of the plurality of devices; assigning each subset of the plurality of devices to a respective virtual local area network, wherein each virtual local area network includes the access control device.

In another example implementation, any of the methods above further include discovering local area network addresses and port access information for each device of the subset of the plurality of devices on the local area network; and storing the discovered local area network addresses and port access information for each device in a look-up table.

In another example implementation, any of the methods above further include discovering device type information and model information for each device of the subset of the plurality of devices; transmitting a request to a remote computer server for technical data related to the device type and model information discovered; and storing the device type information, the model information, and the technical data in a database with respective association to each device of the subset of the plurality of devices.

In another example implementation, the prior method above further includes collecting performance data related to each device in the subset of the plurality of devices; and transmitting the performance data to the remote computer server for incorporation into a store of the technical data on the remote computer server.

Clause 14. An access control device for use on a local area network to provide direct, secure access to a subset of a plurality of devices connected within the local area network to a remote computer device external to the local area network, wherein external access to the local area network is controlled by a network access device and the access control device, the access control device comprising a first network connector for connecting the access control device to the network access device; a second network connector for connecting the access control device to a subnetwork switch connected to the subset of the plurality of devices; a memory storing processing instructions; and a processor configured by the processing instructions to perform the following operations: transmit through the network access device a request to the remote computer device to connect to the access control device via an intermediate STUN server using a peer-to-peer connection; establish a peer-to-peer connection between the access control device and the remote computer device; generate a random service port number to associate with one device of the subset of the plurality of devices; create a data packet to send to the remote computer device and including the random service port number in a payload portion of a data packet; transmit the data packet over the peer-to-peer connection to the remote computer device including instructions to the remote computer device to include the random service port number in payload portions of any return packets transmitted by the remote computer to the access control device; receive return packets from the remote computer device over the peer-to-peer connection with the random service port number associated with the one device in the payload portions of the return packets; and transmit the payload portions of the return packets received from the remote device to the one device to establish a communication tunnel between the remote computer device and the one device without providing the remote computer device direct access to the local area network.

In another example implementation, in any of the methods, wherein the processor is further configured to place a masking IP address in the payload portion in conjunction with the random service port number before forwarding the payload to the remote computer device.

In another example implementation, in any of the methods, wherein the processor is further configured to review packets received over the peer-to-peer connection to identify the masking IP address in the payload portion; and forward data in the payload portions of packets including the masking IP address to the one device associated with the random service port number accompanying the masking IP address.

In another example implementation, in any of the methods, wherein the processor is further configured to instantiate a container environment; create a virtual local area network including the access control device and the subset of the plurality of devices; and configure the container environment to exercise access control over the virtual local area network including management of exposure of the subset of the plurality of devices to the remote computer device.

In another example implementation, in any of the methods, wherein the processor is further configured to provide access to the container environment and the virtual local area network to an interface device connected directly to the access control device; and provide one or more applications within the container environment configured to allow a user of the interface device to control access to individual devices in the subset of the plurality of devices by the remote computer device.

In another example implementation, in any of the methods, wherein the processor is further configured to monitor each device in the subset of the plurality of devices within the container environment to determine a status of each device; generate status information based upon the status of each device; and transmit the status information to the interface device.

In another example implementation, in any of the methods, wherein the processor is further configured to store the random service port number for the one device in a look-up table corresponding to an IP address and port for the one device on the virtual local area network; and for transmission of the payload portions of the return packets, identify random service port number in the payload portion of the return packets; and determine the IP address and port on the virtual local area network for the one device from the look-up table in order to transmit the payload portion of the return packets to the one device.

In another example implementation, in any of the methods, wherein the processor is further configured to assign one or more of the devices of the subset of the plurality of devices to a virtual local area network which includes the access control device.

In another example implementation, in any of the methods, wherein the processor is further configured to assign multiple devices of the plurality of devices to multiple subsets of the plurality of devices; and assign each subset of the plurality of devices to a respective virtual local area network, wherein each virtual local area network includes the access control device.

In another example implementation, in any of the methods, wherein the processor is further configured to discover local area network addresses and port access information for each device of the subset of the plurality of devices on the local area network; and store the discovered local area network addresses and port access information for each device in a look-up table.

In another example implementation, in any of the methods, wherein the processor is further configured to discover device type information and model information for each device of the subset of the plurality of devices; transmit a request to a remote computer server for technical data related to the device type and model information discovered; and store the device type information, the model information, and the technical data in a database structure within the memory with respective association to each device of the subset of the plurality of devices.

In another example implementation, in any of the methods, wherein the processor is further configured to collect performance data related to each device in the subset of the plurality of devices; and transmit the performance data to the remote computer server for incorporation into a store of the technical data on the remote computer server.

In another example implementation, the prior method above further includes a battery to provide backup power upon a power disconnection or failure; and a wireless telephone network transceiver for connection with a wireless telephone network upon failure of an external network connection through the network access device.

In another example implementation, the prior method above further includes a global positioning system chip configured to provide geographic location information about the access control device.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. Unless otherwise defined, all terms (including technical and scientific terms) used in this disclosure have the same meaning as commonly understood by one of ordinary skill in the art to which this disclosure belongs. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for providing direct, secure access to a subset of a plurality of devices connected on a local area network to a remote computer device external to the local area network, wherein external access to the local area network is controlled by a network access device and an access control device is connected to the local area network and separately to the subset of the plurality of devices, the method executed by the access control device comprising
    transmitting through the network access device a request to the remote computer device to connect to the access control device via an intermediate STUN (Session Traversal of User Datagram Protocol [UDP] Through Network Address Translators [NATs]) server using a peer-to-peer connection;
    establishing a peer-to-peer connection between the access control device and the remote computer device;
    generating a random service port number to associate with one device of the subset of the plurality of devices;
    creating a data packet to send to the remote computer device and including the random service port number in a payload portion of a data packet;
    transmitting the data packet over the peer-to-peer connection to the remote computer device including instructions to the remote computer device to include the random service port number in payload portions of any return packets transmitted by the remote computer to the access control device;
    receiving return packets from the remote computer device over the peer-to-peer connection with the random service port number associated with the one device in the payload portions of the return packets; and
    transmitting the payload portions of the return packets received from the remote device to the one device to establish a communication tunnel between the remote computer device and the one device without providing the remote computer device direct access to the local area network.

2. The method of claim 1 further comprising placing a masking IP address in the payload portion in conjunction with the random service port number before forwarding the payload to the remote computer device.

3. The method of claim 2 further comprising
    reviewing packets received over the peer-to-peer connection to identify the masking IP address in the payload portion; and
    forwarding data in the payload portions of packets including the masking IP address to the one device associated with the random service port number accompanying the masking IP address.

4. The method of claim 1 further comprising
    instantiating a container environment;
    creating a virtual local area network including the access control device and the subset of the plurality of devices; and
    configuring the container environment to exercise access control over the virtual local area network including management of exposure of the subset of the plurality of devices to the remote computer device.

5. The method of claim 4 further comprising
    providing access to the container environment and the virtual local area network to an interface device connected directly to the access control device; and
    providing one or more applications within the container environment configured to allow a user of the interface device to control access to individual devices in the subset of the plurality of devices by the remote computer device.

6. The method of claim 5 further comprising
    monitoring each device in the subset of the plurality of devices within the container environment to determine a status of each device;
    generating status information based upon the status of each device; and
    transmitting the status information to the interface device.

7. The method of claim 4 further comprising
    storing the random service port number for the one device in a look-up table corresponding to an IP address and port for the one device on the virtual local area network; and
    wherein the transmitting of the payload portions of the return packets includes
        identifying random service port number in the payload portion of the return packets; and
        determining the IP address and port on the virtual local area network for the one device from the look-up table in order to transmit the payload portion of the return packets to the one device.

8. The method of claim 1, wherein the subset of the plurality of devices is connected to a switch dedicated to subset of the plurality of devices and the access control device is also connected to the switch.

9. The method of claim 1 further comprising assigning one or more of the devices of the subset of the plurality of devices to a virtual local area network which includes the access control device.

10. The method of claim 1 further comprising
    assigning multiple devices of the plurality of devices to multiple subsets of the plurality of devices; and
    assigning each subset of the plurality of devices to a respective virtual local area network, wherein each virtual local area network includes the access control device.

11. The method of claim 1 further comprising
    discovering local area network addresses and port access information for each device of the subset of the plurality of devices on the local area network; and storing the discovered local area network addresses and port access information for each device in a look-up table.

12. The method of claim 1 further comprising
discovering device type information and model information for each device of the subset of the plurality of devices;
transmitting a request to a remote computer server for technical data related to the device type and model information discovered; and
storing the device type information, the model information, and the technical data in a database with respective association to each device of the subset of the plurality of devices.

13. The method of claim 12 further comprising
collecting performance data related to each device in the subset of the plurality of devices; and
transmitting the performance data to the remote computer server for incorporation into a store of the technical data on the remote computer server.

14. An access control device for use on a local area network to provide direct, secure access to a subset of a plurality of devices connected within the local area network to a remote computer device external to the local area network, wherein external access to the local area network is controlled by a network access device and the access control device, the access control device comprising
a first network connector for connecting the access control device to the network access device;
a second network connector for connecting the access control device to a subnetwork switch connected to the subset of the plurality of devices;
a memory storing processing instructions; and
a processor configured by the processing instructions to perform the following operations:
transmit through the network access device a request to the remote computer device to connect to the access control device via an intermediate STUN (Session Traversal of User Datagram Protocol [UDP] Through Network Address Translators [NATs]) server using a peer-to-peer connection;
establish a peer-to-peer connection between the access control device and the remote computer device;
generate a random service port number to associate with one device of the subset of the plurality of devices;
create a data packet to send to the remote computer device and including the random service port number in a payload portion of a data packet;
transmit the data packet over the peer-to-peer connection to the remote computer device including instructions to the remote computer device to include the random service port number in payload portions of any return packets transmitted by the remote computer to the access control device;
receive return packets from the remote computer device over the peer-to-peer connection with the random service port number associated with the one device in the payload portions of the return packets; and
transmit the payload portions of the return packets received from the remote device to the one device to establish a communication tunnel between the remote computer device and the one device without providing the remote computer device direct access to the local area network.

15. The access control device of claim 14, wherein the processor is further configured to place a masking IP address in the payload portion in conjunction with the random service port number before forwarding the payload to the remote computer device.

16. The access control device of claim 15, wherein the processor is further configured to
review packets received over the peer-to-peer connection to identify the masking IP address in the payload portion; and
forward data in the payload portions of packets including the masking IP address to the one device associated with the random service port number accompanying the masking IP address.

17. The access control device of claim 14, wherein the processor is further configured to
instantiate a container environment;
create a virtual local area network including the access control device and the subset of the plurality of devices; and
configure the container environment to exercise access control over the virtual local area network including management of exposure of the subset of the plurality of devices to the remote computer device.

18. The access control device of claim 17, wherein the processor is further configured to
provide access to the container environment and the virtual local area network to an interface device connected directly to the access control device; and
provide one or more applications within the container environment configured to allow a user of the interface device to control access to individual devices in the subset of the plurality of devices by the remote computer device.

19. The access control device of claim 18, wherein the processor is further configured to
monitor each device in the subset of the plurality of devices within the container environment to determine a status of each device;
generate status information based upon the status of each device; and
transmit the status information to the interface device.

20. The access control device of claim 17, wherein the processor is further configured to
store the random service port number for the one device in a look-up table corresponding to an IP address and port for the one device on the virtual local area network; and
for transmission of the payload portions of the return packets,
identify random service port number in the payload portion of the return packets; and
determine the IP address and port on the virtual local area network for the one device from the look-up table in order to transmit the payload portion of the return packets to the one device.

21. The access control device of claim 14, wherein the processor is further configured to assign one or more of the devices of the subset of the plurality of devices to a virtual local area network which includes the access control device.

22. The access control device of claim 14, wherein the processor is further configured to
assign multiple devices of the plurality of devices to multiple subsets of the plurality of devices; and
assign each subset of the plurality of devices to a respective virtual local area network, wherein each virtual local area network includes the access control device.

23. The access control device of claim 14, wherein the processor is further configured to discover local area network addresses and port access information for each device of the subset of the plurality of devices on the local area network; and store the discovered local area network addresses and port access information for each device in a look-up table.

24. The access control device of claim 14, wherein the processor is further configured to discover device type information and model information for each device of the subset of the plurality of devices;

transmit a request to a remote computer server for technical data related to the device type and model information discovered; and store the device type information, the model information, and the technical data in a database structure within the memory with respective association to each device of the subset of the plurality of devices.

25. The access control device of claim 24, wherein the processor is further configured to collect performance data related to each device in the subset of the plurality of devices; and transmit the performance data to the remote computer server for incorporation into a store of the technical data on the remote computer server.

26. The access control device of claim 14 further comprising a battery to provide backup power upon a power disconnection or failure; and a wireless telephone network transceiver for connection with a wireless telephone network upon failure of an external network connection through the network access device.

27. The access control device of claim 14 further comprising a global positioning system chip configured to provide geographic location information about the access control device.

* * * * *